United States Patent
Skeoch

(10) Patent No.: US 11,164,435 B1
(45) Date of Patent: Nov. 2, 2021

(54) AUDIO/VIDEO RECORDING AND COMMUNICATION DOORBELL DEVICES WITH SUPERCAPACITORS

(71) Applicant: Amazon Technologies, Inc., Seattle, WA (US)

(72) Inventor: James Steven Skeoch, Palos Verdes Estates, CA (US)

(73) Assignee: Amazon Technologies, Inc., Seattle, WA (US)

( * ) Notice: Subject to any disclaimer, the term of this patent is extended or adjusted under 35 U.S.C. 154(b) by 129 days.

(21) Appl. No.: 16/198,692

(22) Filed: Nov. 21, 2018

(51) Int. Cl.
  *G08B 13/22* (2006.01)
  *G08B 15/00* (2006.01)
  *H04N 5/232* (2006.01)
  *G08B 3/10* (2006.01)

(52) U.S. Cl.
  CPC ......... *G08B 15/001* (2013.01); *G08B 3/1016* (2013.01); *G08B 13/22* (2013.01); *H04N 5/23241* (2013.01)

(58) Field of Classification Search
  CPC .... G08B 15/001; G08B 3/1016; G08B 13/22; H04N 5/23241
  USPC .......................................................... 348/151
  See application file for complete search history.

(56) References Cited

U.S. PATENT DOCUMENTS

| | | | |
|---|---|---|---|
| 4,764,953 A | 8/1988 | Chern et al. | |
| 5,428,388 A | 6/1995 | von Bauer et al. | |
| 5,760,848 A | 6/1998 | Cho | |
| 6,072,402 A | 6/2000 | Kniffin et al. | |
| 6,192,257 B1 | 2/2001 | Ray | |
| 6,271,752 B1 | 8/2001 | Vaios | |
| 6,429,893 B1 | 8/2002 | Xin | |
| 6,456,322 B1 | 9/2002 | Marinacci | |
| 6,476,858 B1 | 11/2002 | Ramirez Diaz et al. | |
| 6,633,231 B1 | 10/2003 | Okamoto et al. | |
| 6,658,091 B1 | 12/2003 | Naidoo et al. | |
| 6,753,774 B2 | 6/2004 | Pan et al. | |
| 6,970,183 B1 | 11/2005 | Monroe | |
| 7,062,291 B2 | 6/2006 | Ryley et al. | |
| 7,065,196 B2 | 6/2006 | Lee | |

(Continued)

FOREIGN PATENT DOCUMENTS

| | | |
|---|---|---|
| CN | 2585521 | 11/2003 |
| CN | 2792061 | 6/2006 |

(Continued)

*Primary Examiner* — Jae N Noh
(74) *Attorney, Agent, or Firm* — Lee & Hayes, P.C.

(57) ABSTRACT

In implementations described herein, /V recording and communication doorbell devices ("A/V doorbells") may include supercapacitors to supply power to functional components of the A/V doorbells. For example, the A/V doorbells described herein may include one or more supercapacitors to supply power to one or more functional components in situations where doorbell power circuitry is unable to supply sufficient power for the one or more functional components to operate. The A/V doorbells described herein may also include a power control system and supercapacitor control circuitry to regulate the charging and discharging of the one or more supercapacitors. In various implementations, the supercapacitor control circuitry may control the amount of current supplied from the one or more supercapacitors to one or more functional components of the A/V doorbells.

20 Claims, 12 Drawing Sheets

(56) References Cited

U.S. PATENT DOCUMENTS

| | | |
|---|---|---|
| 7,085,361 B2 | 8/2006 | Thomas |
| 7,109,860 B2 | 9/2006 | Wang |
| 7,193,644 B2 | 3/2007 | Carter |
| 7,304,572 B2 | 12/2007 | Sheynman et al. |
| 7,382,249 B2 | 6/2008 | Fancella |
| 7,450,638 B2 | 11/2008 | Iwamura |
| 7,643,056 B2 | 1/2010 | Silsby |
| 7,683,924 B2 | 3/2010 | Oh et al. |
| 7,683,929 B2 | 3/2010 | Elazar et al. |
| 7,738,917 B2 | 6/2010 | Ryley et al. |
| 8,139,098 B2 | 3/2012 | Carter |
| 8,144,183 B2 | 3/2012 | Carter |
| 8,154,581 B2 | 4/2012 | Carter |
| 8,619,136 B2 | 12/2013 | Howarter et al. |
| 8,780,201 B1 | 7/2014 | Scalisi et al. |
| 8,823,795 B1 | 9/2014 | Scalisi et al. |
| 8,842,180 B1 | 9/2014 | Kasmir et al. |
| 8,872,915 B1 | 10/2014 | Scalisi et al. |
| 8,937,659 B1 | 1/2015 | Scalisi et al. |
| 8,941,736 B1 | 1/2015 | Scalisi |
| 8,947,530 B1 | 2/2015 | Scalisi |
| 8,953,040 B1 | 2/2015 | Scalisi et al. |
| 9,013,575 B2 | 4/2015 | Scalisi |
| 9,049,352 B2 | 6/2015 | Scalisi et al. |
| 9,053,622 B2 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir et al. |
| 9,094,584 B2 | 7/2015 | Scalisi et al. |
| 9,113,051 B1 | 8/2015 | Scalisi |
| 9,113,052 B1 | 8/2015 | Scalisi et al. |
| 9,118,819 B1 | 8/2015 | Scalisi et al. |
| 9,142,214 B2 | 9/2015 | Scalisi |
| 9,160,987 B1 | 10/2015 | Kasmir et al. |
| 9,165,444 B2 | 10/2015 | Scalisi |
| 9,172,920 B1 | 10/2015 | Kasmir et al. |
| 9,172,921 B1 | 10/2015 | Scalisi et al. |
| 9,172,922 B1 | 10/2015 | Kasmir et al. |
| 9,179,107 B1 | 11/2015 | Scalisi et al. |
| 9,179,108 B1 | 11/2015 | Scalisi et al. |
| 9,179,109 B1 | 11/2015 | Kasmir et al. |
| 9,196,133 B2 | 11/2015 | Scalisi et al. |
| 9,197,867 B1 | 11/2015 | Scalisi et al. |
| 9,230,424 B1 | 1/2016 | Scalisi et al. |
| 9,237,318 B2 | 1/2016 | Kasmir et al. |
| 9,247,219 B2 | 1/2016 | Kasmir et al. |
| 9,253,455 B1 | 2/2016 | Harrison et al. |
| 9,342,936 B2 | 5/2016 | Scalisi |
| 9,508,239 B1 | 11/2016 | Harrison et al. |
| 9,736,284 B2 | 8/2017 | Scalisi et al. |
| 9,743,049 B2 | 8/2017 | Scalisi et al. |
| 9,769,435 B2 | 9/2017 | Scalisi et al. |
| 9,786,133 B2 | 10/2017 | Harrison et al. |
| 9,799,183 B2 | 10/2017 | Harrison et al. |
| 2002/0094111 A1 | 7/2002 | Puchek et al. |
| 2002/0147982 A1 | 10/2002 | Naidoo et al. |
| 2003/0043047 A1 | 3/2003 | Braun |
| 2004/0085205 A1 | 5/2004 | Yeh |
| 2004/0085450 A1 | 5/2004 | Stuart |
| 2004/0086093 A1 | 5/2004 | Schranz |
| 2004/0095254 A1 | 5/2004 | Maruszczak |
| 2004/0135686 A1 | 7/2004 | Parker |
| 2005/0111660 A1 | 5/2005 | Hosoda |
| 2006/0010199 A1 | 1/2006 | Brailean et al. |
| 2006/0022816 A1 | 2/2006 | Yukawa |
| 2006/0139449 A1 | 6/2006 | Cheng et al. |
| 2006/0156361 A1 | 7/2006 | Wang et al. |
| 2007/0008081 A1 | 1/2007 | Tylicki et al. |
| 2009/0024265 A1* | 1/2009 | Kortschak ............... B60L 58/24 |
| | | 701/22 |
| 2010/0225455 A1 | 9/2010 | Claiborne et al. |
| 2013/0057695 A1 | 3/2013 | Huisking |
| 2013/0271092 A1* | 10/2013 | Borkar .................... H02J 50/05 |
| | | 320/167 |
| 2014/0226059 A1* | 8/2014 | Momose ............. H02J 2207/20 |
| | | 348/370 |
| 2014/0267716 A1 | 9/2014 | Child et al. |
| 2015/0035987 A1 | 2/2015 | Fernandez |
| 2015/0163463 A1 | 6/2015 | Hwang et al. |
| 2016/0133071 A1* | 5/2016 | Henderson .......... E05B 47/0001 |
| | | 70/277 |
| 2019/0070421 A1* | 3/2019 | Chen ....................... H02J 50/10 |
| 2019/0261530 A1* | 8/2019 | Champanis ............. F16M 13/02 |
| 2020/0364991 A1* | 11/2020 | Scalisi ................ H04L 12/2818 |

FOREIGN PATENT DOCUMENTS

| | | |
|---|---|---|
| CN | 208028978 U * | 10/2018 |
| EP | 0944883 | 9/1999 |
| EP | 1480462 | 11/2004 |
| GB | 2286283 | 8/1995 |
| GB | 2354394 | 3/2001 |
| GB | 2357387 | 6/2001 |
| GB | 2400958 | 10/2004 |
| JP | 2001103463 | 4/2001 |
| JP | 2002033839 | 1/2002 |
| JP | 2002125059 | 4/2002 |
| JP | 2002342863 | 11/2002 |
| JP | 2002344640 | 11/2002 |
| JP | 2002354137 | 12/2002 |
| JP | 2002368890 | 12/2002 |
| JP | 2003283696 | 10/2003 |
| JP | 2004128835 | 4/2004 |
| JP | 2005341040 | 12/2005 |
| JP | 2006147650 | 6/2006 |
| JP | 2006262342 | 9/2006 |
| JP | 2009008925 | 1/2009 |
| WO | WO9839894 | 9/1998 |
| WO | WO0113638 | 2/2001 |
| WO | WO0193220 | 12/2001 |
| WO | WO02085019 | 10/2002 |
| WO | WO03028375 | 4/2003 |
| WO | WO03096696 | 11/2003 |
| WO | WO2006038760 | 4/2006 |
| WO | WO2006067782 | 6/2006 |
| WO | WO2007125143 | 11/2007 |

* cited by examiner

AUDIO/VIDEO RECORDING AND COMMUNICATION DOORBELL DEVICES WITH SUPERCAPACITORS

BACKGROUND

Home security is a concern for many homeowners and renters. Those seeking to protect or monitor their homes often wish to have video and audio communications with visitors, for example, those visiting an external door or entryway. A/V recording and communication doorbell devices provide this functionality, and can also aid in crime detection and prevention. For example, audio and/or video captured by an A/V recording and communication doorbell device can be uploaded to the cloud and recorded on a remote server. Subsequent review of the A/V footage can aid law enforcement in capturing perpetrators of home burglaries and other crimes. Further, the presence of one or more A/V recording and communication doorbell devices on the exterior of a home, such as a doorbell unit at the entrance to the home, acts as a powerful deterrent against would-be burglars.

BRIEF DESCRIPTION OF THE DRAWINGS

Embodiments of the present audio/video recording and communication doorbell devices with supercapacitors are described below with reference to the accompanying figures. In the figures, in most cases, the left-most digit(s) of a reference number identifies the figure in which the reference number first appears. The use of the same reference numbers in different figures indicates similar or identical components and/or features.

DETAILED DESCRIPTION

Figure 1:
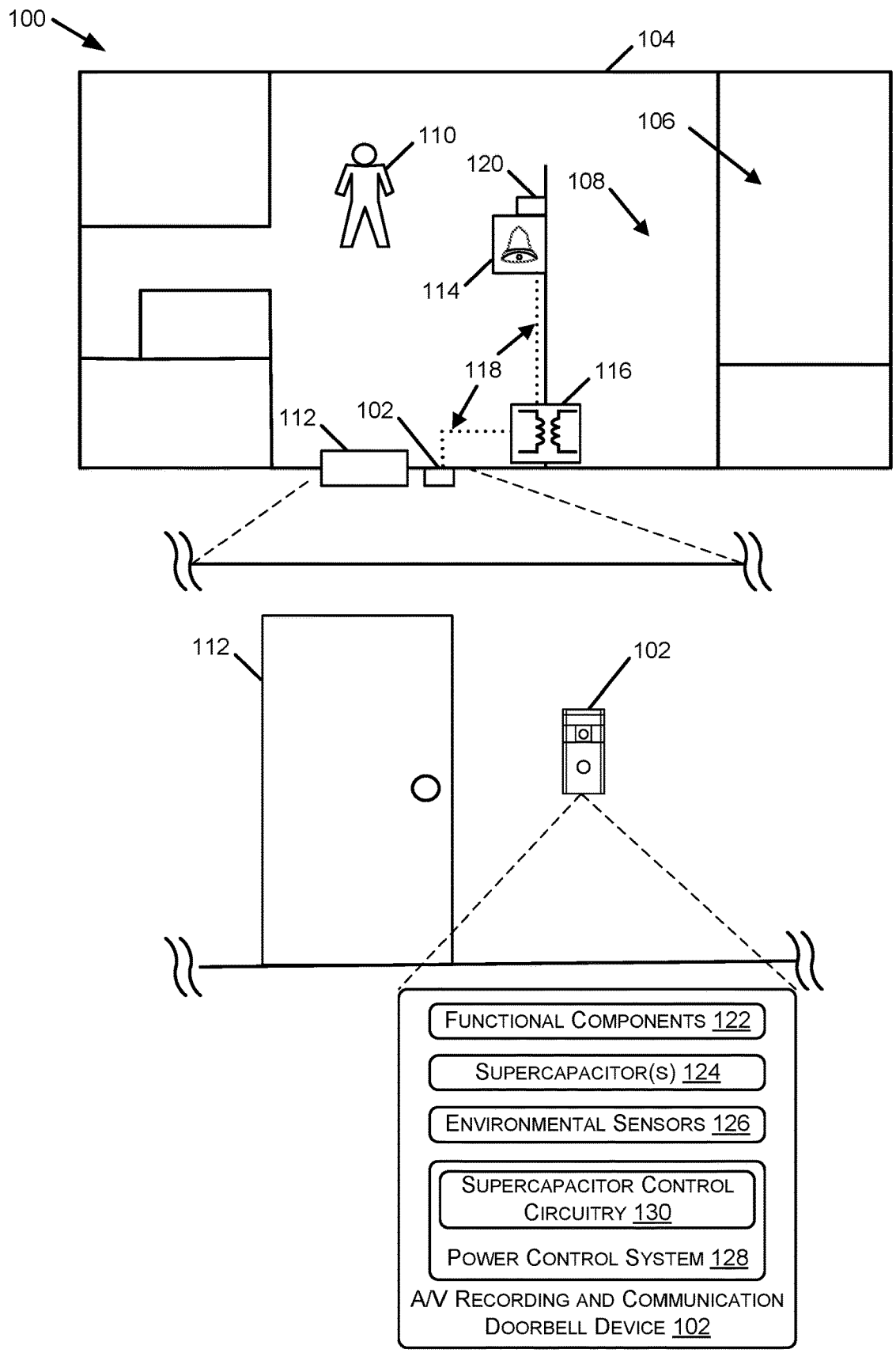
FIG. 1 is a schematic diagram illustrating an example environment that includes an audio/video (A/V) recording and communication doorbell device with a power source that includes at least one supercapacitor according to various aspects of the present disclosure.

One aspect of the present implementations includes the realization that audio/video (A/V) recording and communication doorbell devices ("A/V doorbells") are often implemented with batteries to address interruptions in power supplied to the A/V doorbells. Described herein are A/V doorbells that are powered by supercapacitors. The A/V doorbells may be located near an external door of a structure, such as a house, office building, apartment, condominium, store front, and the like. The A/V doorbells may be positioned to capture audio and/or video data of a space outside of the structure that is proximate to the external door. In this way, individuals that occupy and/or own the structure may obtain audio and/or video data related to activity around the external door. For example, the A/V doorbells may capture audio and/or video data of individuals attempting to gain access to the structure. In other examples, the A/V doorbells may capture audio and/or video data of individuals attempting to make a delivery to the structure. By providing audio and/or video data of the outside of structures, the A/V doorbells may help to prevent unwanted access to the structures and/or prevent damage to the structures by alerting occupants of the structures to unwanted individuals that are near the structures.

The A/V doorbells may be coupled to one or more signaling devices within structures. The one or more signaling devices may produce sound to alert an occupant of a structure that an individual external to the structure is attempting to communicate with the occupant. In various implementations, an A/V doorbell may include a button that is selectable to activate a signaling device within the structure. In certain implementations, structures may include preexisting doorbell power circuitry that may activate signaling devices that are located within the structures. The signaling devices may be activated in response to input at a doorbell activation device that is located near an external door. The doorbell activation device may include a button that is located near an external door of a structure and electrically coupled to a signaling device via the doorbell power circuitry. The implementations of the A/V doorbells described herein may be coupled to the doorbell power circuitry and used instead of or in addition to preexisting doorbell activation devices.

In conventional doorbell systems, power is applied to a signaling device in response an individual depressing a doorbell activation device (e.g., a button) disposed on the exterior of a structure. The amount of power supplied activates the signaling device to produce a sound to alert an occupant of the structure. In particular implementations, the A/V doorbells may replace the doorbell button of conventional systems. The A/V doorbells may include one or more functional components that draw power using the preexisting doorbell power circuitry to operate. For example, the A/V doorbells may include one or more cameras, one or more microphones, one or more communication systems, one or more lighting devices, one or more additional sensors, one or more processors, memory, combinations thereof, and the like, that may use power for operation. In scenarios where both the A/V doorbells and the signaling device are coupled to the doorbell power circuitry, the A/V doorbells may be cut-off from at least a portion of the power applied via the doorbell power circuitry. That is, since at least a portion of the power supplied via the doorbell power circuitry may be diverted to the signaling device to produce sound, the amount of power supplied to the A/V doorbells may be reduced. In various situations, the amount of power supplied to the A/V doorbells may be insufficient for functional components of the A/V doorbells to operate properly. The A/V doorbells may include an additional, internal power source to compensate for any deficiencies in the amount of power supplied to various functional components of the A/V doorbells, such as during activation of the signaling device.

In conventional systems, A/V doorbells may include a battery to supply power to one or more functional components of the A/V doorbells. The battery may include a rechargeable battery that is recharged by drawing power from the doorbell power circuitry. In particular, power may be supplied by the battery to functional components of the A/V doorbells in situations where the A/V doorbells are unable to draw sufficient power from the doorbell power circuitry to operate the functional components. Typically, batteries have a limited number of charge and discharge cycles, and batteries charge and discharge at relatively slow rates. Additionally, the lifetime of a battery, and/or the satisfactory performance of a battery, may be constrained to a given range of temperatures. For example, the performance of batteries may be detrimentally impacted in situations where temperatures are less than 10° C., less than 8° C., or less than 5° C. In other examples, the performance of batteries may be detrimentally impacted by temperatures greater than 35° C., greater than 38° C., greater than 40° C., or greater than 42° C.

In implementations described herein, A/V doorbells may include supercapacitors to supply power to functional components of the A/V doorbells. To illustrate, the A/V doorbells described herein may include one or more supercapacitors to supply power to one or more functional components in situations where doorbell power circuitry is unable to supply sufficient power for the one or more functional components to operate. The A/V doorbells described herein may also include a power control system and supercapacitor control circuitry to regulate the charging and discharging of the one or more supercapacitors. In various implementations, the supercapacitor control circuitry may control the amount of current supplied from the one or more supercapacitors to one or more functional components of the A/V doorbells. In illustrative examples, the supercapacitor control circuitry may control the amount of current supplied by the one or more supercapacitors to functional components of the A/V doorbells to maintain a consistent voltage along a power supply line that supplies power to one or more functional components of the A/V doorbells from the one or more supercapacitors.

Additionally, implementations of A/V doorbells described herein may include one or more environmental sensors. The one or more environmental sensors may include temperature sensors, humidity sensors, barometric pressure sensors, combinations thereof, and the like. The power control systems of the A/V doorbells may modify charging and/or discharging conditions of one or more supercapacitors based at least partly on environmental conditions of the A/V doorbells. For example, the voltage applied to charge the one or more supercapacitors may be modified as the ambient temperature around the A/V doorbells changes. In particular, devices that are located outside of a structure may be exposed to temperature fluctuations and/or extreme temperatures. In these situations, the conditions under which the one or more supercapacitors of A/V doorbells are charged may change under various temperature conditions to provide enhanced performance and to reduce wear and tear on the one or more supercapacitors.

By including supercapacitors, rather than batteries, the A/V doorbells described herein provide satisfactory performance over a wider range of ambient temperatures. In addition, the amount of time that the A/V doorbells can operate without replacing the one or more supercapacitors as a power source is increased relative to the life cycle of a battery-powered A/V doorbell.

The remaining detailed description describes the present implementations with reference to the drawings. In the drawings, reference numbers label elements of the present implementations. These reference numbers are reproduced below in connection with the discussion of the corresponding drawing features.

FIG. 1 illustrates an example environment 100 that includes an audio/video (A/V) recording and communication doorbell device ("A/V doorbell") 102 with a power source that includes at least one supercapacitor. The environment 100 may also include a structure 104. The structure 104 may include a house, an apartment, a condominium, an office, a place of business, combinations thereof, and the like. The structure 104 may include one or more rooms, such as a first representative room 106 and a second representative room 108. In addition, the structure 104 may include one or more occupants, such as occupant 110. The occupant 110 may reside in the structure 104 or be otherwise associated with the structure 104 in some way, such as a patron of a place of business or a worker in an office.

The structure 104 may also include an external door 112 and a signaling device 114 that may produce sound upon activation. The external door 112 may be opened to allow entry or exit from the structure 104. The signaling device 114 may comprise one or more sound-emitting elements (not shown), and may produce sound to alert the occupant 110 that someone external to the structure 104 has activated the signaling device 114. In various embodiments, the signaling device 114 may comprise one or more light-emitting elements (not shown) in addition to, or instead of, the sound-emitting element(s). For example, the light-emitting element(s) may comprise one or more LEDs, a strobe, etc., which may produce light to alert the occupant 110 that someone external to the structure 104 has activated the signaling device 114. In some examples, the signaling device 114 may be activated by an individual that is outside of the structure 104 and wanting to gain entry into the structure 104. In other examples, the signaling device 114 may be activated by an individual that is outside of the structure 104 to cause the occupant 110 to open the external door 112 such that the individual may speak with the occupant 110, make a delivery to the structure 104, and so forth.

The signaling device 114 may produce sound via a mechanical device, via an electronic device, or a combination thereof. To produce sound, the signaling device 114 may draw power from a power source. The power source may be connected to a power grid and/or power generator. In particular implementations, the structure 104 may include a power source that supplies power to various portions of the structure 104. For example, the structure 104 may include one or more outlets that may supply power from the power source to devices within the structure 104. In addition, the structure 104 may include wiring that is coupled to lights, switches, and other devices to provide power from the power source to various additional devices within the structure 104. The power from the power source can correspond to a particular voltage or range of voltages and to a particular current or range of currents. In various examples, power from the power source can correspond to voltages having values of 120 V, 230 V, or between 120 V and 230 V. Further, power from the power source can correspond to currents having frequency values of 50 Hz, 60 Hz, or between 50 Hz and 60 Hz. The power source for the structure 104 may be an alternating current (AC) power source.

In certain implementations, the signaling device 114 may operate at a voltage and/or frequency that is different from the voltage and/or frequency of the power source of the structure 104. For example, the signaling device 114 may operate at voltages of 8 V, 12 V, or 16 V. In some examples, the signaling device 114 may operate at voltages less than 8 V. The structure 104 may include circuitry and wiring, such as transformer 116 and wiring 118, coupled to the power source to supply power from the power source of the structure 104 to the signaling device 114 at a voltage that may be used by the signaling device 114 to produce sound. To illustrate, the transformer 116 may decrease the voltage from the power source to a value, such as 12 V or 16 V, that may be supplied to the signaling device 114 to generate sound. The transformer 116 and the wiring 118 may comprise at least a portion of doorbell power circuitry of the structure 104.

The A/V doorbell 102 may be attached to the structure 104 at a location that is proximate to the external door 112. For example, the A/V doorbell 102 may include a mounting apparatus to mount the A/V doorbell 102 to the structure 104. The A/V doorbell 102 may draw power from the circuitry and wiring of the structure 104, such as the transformer 116 and the wiring 118, that is used to provide power to the signaling device 114. In this way, the A/V doorbell 102 may obtain power to operate various components.

The environment 100 may also include adaptive circuitry 120. The adaptive circuitry 120 may be added to the preexisting signaling device arrangement included in the structure 104 that includes the signaling device 114, the transformer 116, and the wiring 118. The adaptive circuitry 120 may supply power to the A/V doorbell 102 when the signaling device 114 is not activated and supply power to the signaling device 114 when the signaling device 114 is activated. In particular implementations, the adaptive circuitry 120 may be added to preexisting doorbell power circuitry to facilitate both the signaling device 114 and the A/V doorbell 102 drawing power via the doorbell power circuitry of the structure 104. The adaptive circuitry 120 may include one or more components, such as a switch, a field effect transistor (FET), a triode for alternating current (TRIAC), an alternating current (AC)/direct current (DC) converter, voltage modification circuitry, such as buck circuitry to step down a voltage, combinations thereof, and the like.

In illustrative implementations, input at the A/V doorbell 102, such as pushing or selecting a button, may cause the A/V doorbell 102 to activate one or more components of the adaptive circuitry 120 to supply power to the signaling device 114 and activate the signaling device 114. For example, the A/V doorbell 102 may send a signal to activate a switch included in the adaptive circuitry 120 to divert power from the A/V doorbell 102 to the signaling device 114. In these situations, supplying power to the signaling device 114 may cause the amount of power supplied to the A/V recording and communication device 102 to decrease. Additionally, after the signaling device 114 is no longer activated, the adaptive circuitry 120 may cause power from the doorbell power circuitry to be supplied to the A/V doorbell 102 instead of to the signaling device 114. In certain implementations, a switch included in the adaptive circuitry 120 may be deactivated to divert power to the A/V doorbell 102 and away from the signaling device 114.

In particular implementations, the A/V doorbell 102 may include one or more functional components 122. The one or more functional components 122 may include components that draw an amount of power to operate, such as one or more cameras, one or more microphones, one or more lighting devices, one or more processors, memory, one or more communication systems, combinations thereof, and the like. In various implementations, the A/V doorbell 102 may capture image data, sound data, or both image data and sound data in the vicinity of the external door 122. The image data and/or the sound data may be related to individuals, objects, or both individuals and objects that are within a field of view of the A/V doorbell 102.

The A/V doorbell 102 may also be used by occupants 110 of the structure 104 to communicate with individuals outside of the structure 104. For example, the A/V doorbell 102 may communicate audio data and/or video data between one or more individuals located outside of the structure 104 and one or more occupants 110 within the structure 104. In some examples, the A/V doorbell 102 may communicate audio data and/or video data between individuals located outside of the structure 104 and one or more individuals that are associated with the structure 104 and not located within the structure 104. To illustrate, an owner of the structure 104 that is not inside the structure 104 may communicate with one or more individuals outside of the structure 104, such as a delivery person, via the A/V doorbell 102.

Additionally, the A/V doorbell 102 may include one or more supercapacitors 124. The one or more supercapacitors 124 may also be referred to as double layer capacitors. In particular implementations, the one or more supercapacitors 124 may include two electrodes (e.g., an anode and a cathode) that are separated by an electrolyte and a separator layer. Applying a voltage to the electrodes may cause a double layer of charged particles to form near the surface of each electrode. For example, a layer of positively charged particles of a cathode may be disposed at or near the surface of the cathode, while a layer of negatively charged particles in the electrolyte may also be disposed near the surface of the cathode. Conversely, a layer of negatively charged particles of an anode may be disposed at or near the surface of the anode, while a layer of positively charged particles in the electrolyte may be disposed near the surface of the anode. The layers of positively charged particles and the layers of negatively charged particles can be separated by a relatively thin layer of electrolyte molecules. When a voltage is applied, an electric field may develop in the layer of electrolyte molecules between the positively charged particles and the negatively charged particles. The voltage produced across the electrodes of supercapacitors corresponds to the voltage applied to charge the supercapacitors. Over time, the voltage across the electrodes of supercapacitors may decrease over time due to current leaking from the supercapacitors.

In contrast to supercapacitors, batteries include electrochemical cells that produce energy via chemical reactions when a current is applied to electrodes of the battery. The chemical reactions take place when ions of an electrolyte react with ions from the electrodes. Additionally, conventional capacitors simply include conductive plates separated by a dielectric medium, which is usually air, and store energy in the form of an electric field that is produced when a voltage is applied to the terminals of the capacitor. Thus, the one or more supercapacitors operate differently from a battery or a conventional capacitor by producing a double layer of oppositely charged particles at the interface between the electrodes and the electrolyte.

In illustrative implementations, the one or more supercapacitors 124 may supply power to the one or more functional components 122. For example, during a period of time when the signaling device 114 is activated and power is diverted from the A/V doorbell 102 to the signaling device 114 by the adaptive circuitry 120, the one or more supercapacitors 124 may supply power to keep at least a portion of the one or more functional components 122 operational. To illustrate, the one or more supercapacitors 124 may supply power to one or more cameras, one or more microphones, one or more lighting devices, one or more processors, memory, one or more additional sensors, or combinations thereof, in situations where power supplied to the A/V doorbell 102 from the preexisting doorbell power circuitry of the structure 104 decreases. In this way, the operation of the A/V doorbell 102 is not interrupted during activation of the signaling device 114.

Further, the A/V doorbell 102 may include one or more environmental sensors 126. The one or more environmental sensors 126 may include at least one temperature sensor, at least one moisture sensor, at least one barometric pressure sensor, combinations thereof, and so forth. In various implementations, information obtained via the one or more environmental sensors 126 may be used to control the charging and/or discharging of the one or more supercapacitors 124. For example, a voltage applied to charge the one or more supercapacitors 124 may be based at least partly on ambient temperatures outside of the structure 104. In other examples, an amount of time that the one or more supercapacitors 124 are discharged may be based at least partly on ambient temperatures outside of the structure 104. The use of information from the one or more environmental sensors 126 to control the charging and/or discharging of the one or more supercapacitors 124 may increase the lifetime and/or efficiency of the one or more supercapacitors 124.

The A/V doorbell 102 may also include a power control system 128. The power control system 128 may include circuitry, software, hardware (e.g., application-specific integrated circuits (ASICs), field-programmable gate arrays (FPGAs)), or combinations thereof, to control power supplied to the one or more functional components 122. In particular implementations, the power control system 128 may obtain environmental information from the one or more environmental sensors 126 indicating one or more conditions outside of the structure 104, such as at least one of temperature, relative humidity, or barometric pressure. The power control system 128 may determine a maximum voltage to apply to charge the one or more supercapacitors 124 based at least partly on the environmental information obtained from the one or more environmental sensors 126. In illustrative examples, as the temperature outside of the structure 104 increases, the voltage applied to charge the one or more supercapacitors 124 may decrease. By modifying the voltage applied to charge the one or more supercapacitors 124 based on environmental conditions outside of the structure 104, the power control system 128 may increase the lifetime of the one or more supercapacitors 124, because charging the one or more supercapacitors above a threshold voltage at certain temperatures may damage the one or more supercapacitors 124 and decrease the lifetime of the one or more supercapacitors 124.

The power control system 128 may also determine an indicator of performance degradation of the one or more supercapacitors 124, such as a number of charge and a number of discharge cycles associated with the one or more supercapacitors 124. In various implementations, the power control system 128 may determine a voltage to apply to charge the one or more supercapacitors 124 based at least partly on the number of charge cycles and the number of discharge cycles associated with the one or more supercapacitors 124. In particular implementations, as the number of charge cycles and the number of discharge cycles of the one or more supercapacitors 124 increase, the power control system 128 may increase the voltage applied to charge the supercapacitors 124. To illustrate, as the number of charge cycles and the number of discharge cycles of the one or more supercapacitors 124 increases, the amount of power provided by the one or more supercapacitors 124 may decrease. In some situations, the amount of power supplied by the one or more supercapacitors 124 at a previous voltage after a specified number of charge cycles and a specified number of discharge cycles may decrease and be insufficient to operate one or more of the functional components 122. In these scenarios, the power control system 128 may increase the voltage to which the one or more supercapacitors 124 are charged to ensure that the one or more supercapacitors 124 can supply sufficient power to the one or more functional components 124.

In addition, the power control system 128 may include or be coupled to supercapacitor control circuitry 130 that regulates the power supplied to the one or more functional components 122 from the one or more supercapacitors 124. For example, the power supplied to the one or more functional components 122 may be supplied at a relatively constant voltage. In particular implementations, the amount of current discharged from the one or more supercapacitors 124 may vary over time. The power control system 128 may regulate the current being discharged from the one or more supercapacitors 124 such that the voltage used to supply power to the one or more functional components 122 is maintained at a relatively constant value even though the amount of current being discharged by the one or more supercapacitors 124 is varying.

Further, the power control system 128 may control the charging and/or discharging of the one or more supercapacitors 124 based at least partly on an amount of time that the signaling device 114 is activated. In various implementations, the signaling device 114 may produce sound for an amount of time, such as from one second to fifteen seconds, from one second to ten seconds, from one second to eight seconds, or from one second to five seconds. The power control system 128 may determine a voltage to apply to charge the one or more supercapacitors 124 that is sufficient to supply power to the one or more functional components 122 for at least the amount of time that the signaling device 114 is activated. In this way, the power control system 128 may increase a lifetime of the one or more supercapacitors 124 by controlling the voltage applied to charge the one or more supercapacitors 124 (e.g., by keeping the applied voltage low), while ensuring that the functional components 122 have sufficient power to operate when the signaling device 114 is drawing power from the doorbell power circuitry of the structure 104, such as the transformer 116 and the wiring 118.

In particular implementations, the power control system 128 may monitor the voltage of the one or more supercapacitors. In various implementations, the power control system 128 may determine that the voltage of the one or more supercapacitors 124 has decreased over time due to current leaking from the one or more supercapacitors 124. In situations where the voltage of the one or more supercapacitors 124 is less than a specified threshold voltage, the power control system 128 may draw power from the doorbell power circuitry to charge the one or more supercapacitors 124 to a particular voltage. As explained previously, the voltage to which the one or more supercapacitors 124 is charged may be based on one or more factors, such as environmental conditions external to the structure 102, indicators of performance degradation of the one or more supercapacitors, and/or activation time of the signaling device 114.

Figure 2:
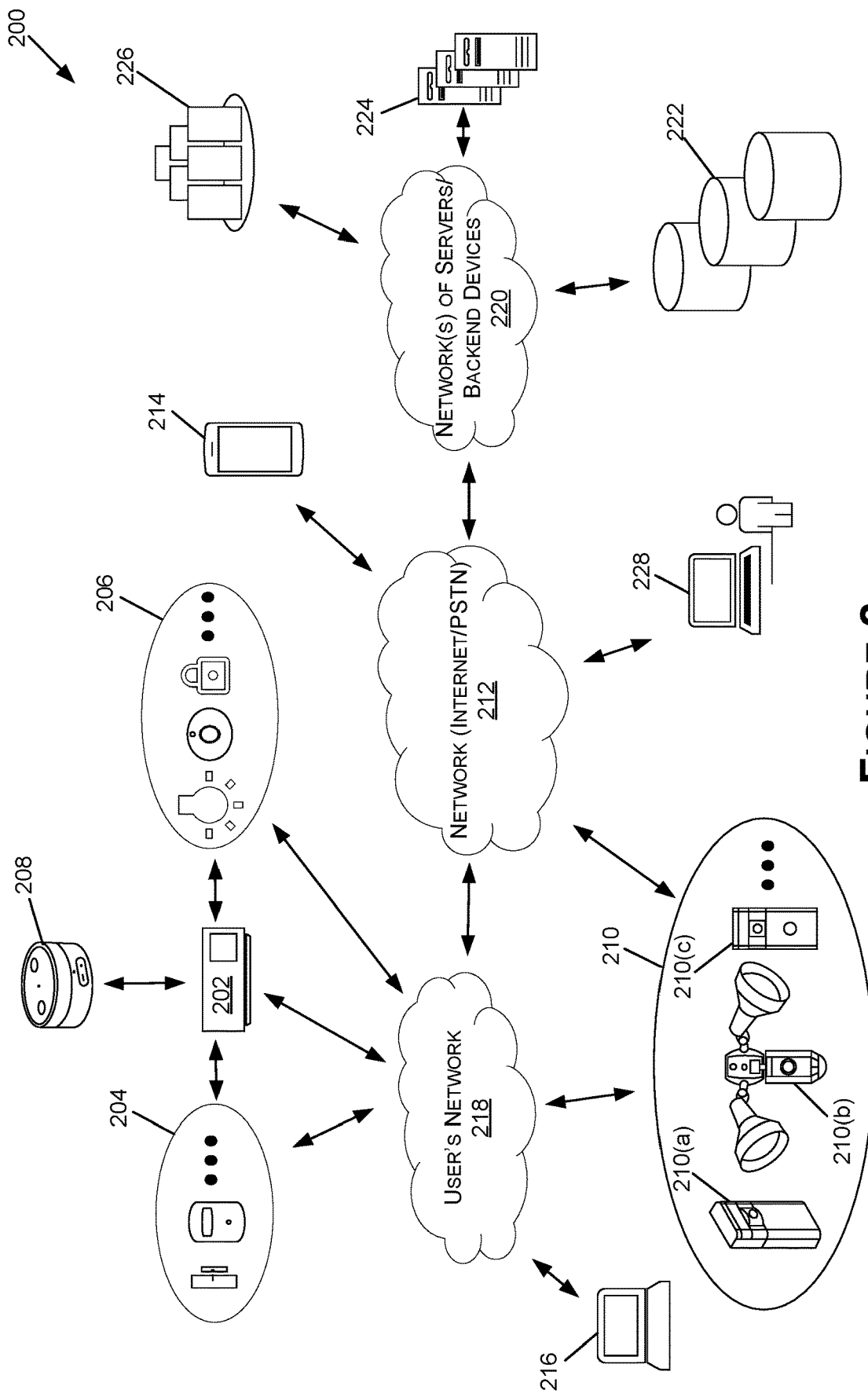
FIG. 2 is a schematic diagram illustrating a system for communicating in a network according to various aspects of the present disclosure.

FIG. 2 is a schematic diagram illustrating a system 200 for communicating in a network according to various aspects of the present disclosure. Home automation, or smart home, is building automation for the home. Home automation enable users (e.g., home owners and authorized individuals) to control and/or automate various devices and/or systems, such as lighting, heating (e.g., smart thermostats), ventilation, home entertainment, air conditioning (HVAC), blinds/shades, security devices (e.g., contact sensors, smoke/CO detectors, motion sensors, etc.), washers/dryers, ovens, refrigerators/freezers, and/or other network connected devices suitable for use in the home. In various implementations, Wi-Fi is used for remote monitoring and control of such devices and/or systems. Smart home devices (e.g., hub devices 202, sensors 204, automation devices 206, a virtual assistant (VA) device 208, Audio/Video (A/V) recording and communication devices 210, etc.), when remotely monitored and controlled via a network (Internet/a public switched telephone network (PSTN)) 212 (which may be similar to, and represent the network 112), may be considered to be components of the "Internet of Things." Smart home systems may include switches and/or sensors (e.g., the sensors 204) connected to a central hub such as the smart-home hub device 202 and/or the VA device 208 (the hub device 202 and/or the VA device 208 may alternatively be referred to as a gateway, a controller, a home-automation hub, or an intelligent personal assistance device) from which the system may be controlled through various user interfaces, such as voice commands and/or a touchscreen. Various examples, of user interfaces may include any or all of a wall-mounted terminal (e.g., a keypad, a touchscreen, etc.), software installed on the client devices 214, 216 (e.g., a mobile application), a tablet computer, or a web interface. Furthermore, these user interfaces are often but not always supported by Internet cloud services. In one example, the Internet cloud services are responsible for obtaining user input via the user interfaces (e.g., a user interface of the hub device 202 and/or the VA device 208) and causing the smart home devices (e.g., the sensors 204, the automation devices 206, etc.) to perform an operation in response to the user input.

The hub device 202, the VA device 208, the sensors 204, the automation devices 206, the A/V recording and communication devices 210, and/or client devices 214, 216 may use one or more wired and/or wireless communication protocols to communicate, including, for example and without limitation, Wi-Fi (e.g., the user's network 218), X10, Ethernet, RS-485, 6LoWPAN, Bluetooth LE (BLE), ZigBee, Z-Wave, and/or a low power wide-area networks (LPWAN), such as a chirp spread spectrum (CSS) modulation technology network (e.g., LoRaWAN), an Ultra Narrow Band modulation technology network (e.g., Sigfox, Telensa, NB-IoT, etc.), RingNet, and/or the like.

The user's network 218 may be, for example, a wired and/or wireless network. If the user's network 218 is wireless, or includes a wireless component, the user's network 218 may be a Wi-Fi network compatible with the IEEE 802.11 standard and/or other wireless communication standard(s). Furthermore, the user's network 218 may be connected to other networks such as the network 212, which may comprise, for example, the Internet and/or PSTN.

The system 200 may include one or more A/V recording and communication devices 210 (alternatively be referred to herein as "A/V devices 210" or "A/V device 210") (which may represent, and/or be similar to, the A/V doorbell 102 of FIG. 1). The A/V devices 210 may include security cameras 210(a), light cameras 210(b) (e.g., floodlight cameras, spotlight cameras, etc.), video doorbells 210(c) (e.g., wall powered and/or battery powered video doorbells), and/or other devices capable of recording audio data and/or image data. The A/V devices 210 may be configured to access a user's network 218 to connect to a network (Internet/PSTN) 212 and/or may be configured to access a cellular network to connect to the network (Internet/PSTN) 212. The components and functionality of the A/V devices 210 are described in more detail below with respect to FIG. 3.

The system 200 may further include a smart-home hub device 202 (which may alternatively be referred to herein as the "hub device 202") connected to the user's network 218 and/or the network (Internet/PSTN) 212. The smart-home hub device 202 (also known as a home automation hub, gateway device, or network device), may comprise any device that facilitates communication with and control of the sensors 204, automation devices 206, the VA device 208, and/or the one or more A/V devices 210. For example, the smart-home hub device 202 may be a component of a security system and/or a home automation system installed at a location (e.g., a property, a premise, a home, a business, etc.). In some implementations, the A/V devices 210, the VA device 208, the sensors 204, and/or the automation devices 206 communicate with the smart-home hub device 202 directly and/or indirectly using one or more wireless and/or wired communication protocols (e.g., BLE, Zigbee, Z-Wave, etc.), the user's network 218 (e.g., Wi-Fi, Ethernet, etc.), and/or the network (Internet/PSTN) 212. In some of the present implementations, the A/V devices 210, the VA device 208, the sensors 204, and/or the automation devices 206 may, in addition to or in lieu of communicating with the smart-home hub device 202, communicate with the client devices 214, 216, the VA device 208, and/or one or more of components of the network of servers/backend devices 220 directly and/or indirectly via the user's network 218 and/or the network (Internet/PSTN) 212.

As illustrated in FIG. 2, the system 200 includes the VA device 208. The VA device 208 may be connected to the user's network 218 and/or the network (Internet/PSTN) 212. The VA device 208 may include an intelligent personal assistant, such as, without limitation, Amazon Alexa® and/or Apple Siri®. For example, the VA device 208 may be configured to receive voice commands, process the voice commands to determine one or more actions and/or responses (e.g., transmit the voice commands to the one or more components of the network of servers/backend devices 220 for processing), and perform the one or more actions and/or responses, such as to activate and/or change the status of one or more of the sensors 204, automation devices 206, or A/V devices 210. In some implementations, the VA device 208 is configured to process user inputs (e.g., voice commands) without transmitting information to the network of servers/backend devices 220 for processing. The VA device 208 may include at least one speaker (e.g., for playing music, for outputting the audio data generated by the A/V devices 210, for outputting the voice of a digital assistant, etc.), at least one a microphone (e.g., for receiving commands, for recording audio data, etc.), and a display (e.g., for displaying a user interface, for displaying the image data generated by the A/V devices 210, etc.). In various implementations, the VA device 208 may include an array of speakers that are able to produce beams of sound. Although illustrated as a separate component in FIG. 2, in some implementations the VA device 208 may not be a separate component from the hub device 202. In such implementations, the hub device 202 may include the functionality of the VA device 208 or the VA device 208 may include the functionality of the hub device 202.

The one or more sensors 204 may include, for example, at least one of a door sensor, a window sensor, a contact sensor, a tilt sensor, a temperature sensor, a carbon monoxide sensor, a smoke detector, a light sensor, a glass break sensor, a freeze sensor, a flood sensor, a moisture sensor, a motion sensor, and/or other sensors that may provide the user/owner of the security system a notification of a security event at his or her property.

In various implementations, a contact sensor may include any component configured to inform (e.g., via a signal) the security system whether an object (e.g., a door or a window) is open or closed. A contact sensor may include first and second components: a first component installed on the object itself (e.g., the door or the window); the second component installed next to the object (e.g., on the door jamb). The first and second components of the contact sensor, however, need not actually be in physical contact with one another in order to be in the closed (not faulted) state. For example, at least one of the first and second components may include a magnet, and the contact sensor may rely on the Hall effect for determining a proximity of the first and second pieces to one another. When the door, window, or other object, is opened, and the first and second components move apart from one another, the contact sensor may transmit an open signal to the security system (e.g., to the hub device 202). A similar process may be performed when the object is closed. In some examples, a signal transmitted by the security system by the contact sensor during opening and/or closing may be the same signal, and the hub device 202 may interpret the signal based on the known state of the object (e.g., when a door is closed, and the signal is received, the hub device 202 may update the status of the door to open).

The one or more automation devices 206 may include, for example, at least one of an outdoor lighting system, an indoor lighting system, and indoor/outdoor lighting system, a temperature control system (e.g., a thermostat), a shade/blind control system, a locking control system (e.g., door lock, window lock, etc.), a home entertainment automation system (e.g., TV control, sound system control, etc.), an irrigation control system, a wireless signal range extender (e.g., a Wi-Fi range extender, a Z-Wave range extender, etc.), a barrier control device (e.g., an automated door hinge), a smart doormat, and/or other automation devices.

As described herein, in some of the present implementations, some or all of the client devices 214, 216, the A/V device(s) 210, the smart-home hub device 202, the VA device 208, the sensors 204, and the automation devices 206 may be referred to as a security system and/or a home-automation system. The security system and/or home-automation system may be installed at location, such as a property, home, business, or premises for the purpose of securing and/or automating all or a portion of the location.

The system 200 may further include one or more client devices 214, 216. The client devices 214, 216 may communicate with and/or be associated with (e.g., capable of access to and control of) the A/V devices 210, a smart-home hub device 202, the VA device 208, sensors 204, and/or automation devices 206. In various implementations, the client devices 214, 216 communicate with other devices using one or more wireless and/or wired communication protocols, the user's network, and/or the network (Internet/PSTN) 212, as described herein. The client devices 214, 216 may comprise, for example, a mobile device such as a smartphone or a personal digital assistant (PDA), or a computing device such as a tablet computer, a laptop computer, a desktop computer, etc. In some implementations, the client devices 214, 216 includes a connected device, such as a smart watch, Bluetooth headphones, another wearable device, or the like. In such implementations, the client devices 214, 216 may include a combination of the smartphone or other device and a connected device (e.g., a wearable device), such that alerts, data, and/or information received by the smartphone or other device are provided to the connected device, and one or more controls of the smartphone or other device may be input using the connected device (e.g., by touch, voice, etc.).

The A/V devices 210, the hub device 202, the VA device 208, the automation devices 206, the sensors 204, and/or the client devices 214, 216 may also communicate, via the user's network 218 and/or the network (Internet/PSTN) 212, with network(s) of servers and/or backend devices 220, such as (but not limited to) one or more remote storage devices 222 (may be referred to interchangeably as "cloud storage device(s)"), one or more backend servers 224, and one or more backend application programming interfaces (APIs) 226. While FIG. 2 illustrates the storage device 222, the backend server 224, and the backend API 226 as components separate from the network 220, it is to be understood that the storage device 222, the backend server 224, and/or the backend API 226 may be considered to be components of the network 220. For example, the network 220 may include a data center with a plurality of computing resources used to implement the storage device 222, the backend server 224, and the backend API 226.

The backend server 224 may comprise a computer program or other computer executable code that, when executed by processor(s) of the backend server 224, causes the backend server 224 to wait for requests from other computer systems or software (clients) and provide responses. In implementations, the backend server 224 shares data and/or hardware and/or software resources among the client devices 214, 216. This architecture is called the client-server model. The client devices 214, 216 may run on the same computer or may connect to the backend server 224 over the network (Internet/PSTN) 212 and/or the network 220. Examples of computing servers include database servers, file servers, mail servers, print servers, web servers, game servers, and application servers. The term server may be construed broadly to include any computerized process that shares a resource to one or more client processes.

The backend API 226 may comprise, for example, a server (e.g. a real server, or a virtual machine, or a machine running in a cloud infrastructure as a service), or multiple servers networked together, exposing at least one API to clients. In various implementations, the backend API 226 is provided by servers including various components such as an application server (e.g. software servers), a caching layer, a database layer, or other components suitable for implementing one or more APIs. The backend API 226 may, for example, comprise a plurality of applications, each of which communicate with one another using one or more public APIs. In some implementations, the backend API 226 maintains user data and provides user management capabilities, thereby reducing the load (e.g., memory and processor consumption) of the client devices 214, 216.

In various implementations, an API is a set of routines, protocols, and tools for building software and applications. Furthermore, the API may describe a software component in terms of its operations, inputs, outputs, and underlying types, defining functionalities that are independent of their respective implementations, which allows definitions and implementations to vary without compromising the interface. As such, the API may provide a programmer with access to a particular application's functionality without the need to modify the particular application.

The backend API 226 illustrated in FIG. 2 may further include one or more services (also referred to as network services). A network service is an application that provides data storage, manipulation, presentation, communication, and/or other capability. Network services are often implemented using a client-server architecture based on application-layer network protocols. Each service may be provided by a server component (e.g., the backend server 224) running on one or more computers (such as a dedicated server computer offering multiple services) and accessed via a network by client components running on other devices (e.g., client devices 214, 216). However, the client and server components can both be run on the same machine. Clients and servers may have a user interface, and sometimes other hardware associated with them.

The network 220 may be any wireless network, any wired network, or a combination thereof, configured to operatively couple the above-mentioned modules, devices, components, and/or systems as illustrated in FIG. 2. For example, the network 220, the user's network 218, and/or the network (Internet PSTN) 212 may include one or more of the following: a PSTN (public switched telephone network), the Internet, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, a Digital Data Service (DDS) connection, a DSL (Digital Subscriber Line) connection, an Ethernet connection, an ISDN (Integrated Services Digital Network) line, a dial-up port such as a V.90, V.34, or V.34bis analog modem connection, a cable modem, an ATM (Asynchronous Transfer Mode) connection, or an FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), LTE, VoLTE, LoRaWAN, LPWAN, RPMA, LTE Cat-"X" (e.g. LTE Cat 1, LTE Cat 0, LTE CatM1, LTE Cat NB1), CDMA (Code Division Multiple Access), TDMA (Time Division Multiple Access), FDMA (Frequency Division Multiple Access), and/or OFDMA (Orthogonal Frequency Division Multiple Access) cellular phone networks, global navigation satellite system (GNSS), such as global positioning systems (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-4024 (Firewire) connection, Fibre Channel connection, IrDA (infrared) port, SCSI (Small Computer Systems Interface) connection, USB (Universal Serial Bus) connection, or other wired or wireless, digital or analog, interface or connection, mesh or Digi® networking.

The hub device 202, the VA device 208, and/or any of the components of the network(s) of servers/backend devices 220 (e.g., the backend server 224, the backend API 226, the storage devices 222, etc.) may be referred to herein as a "network device" or "network devices."

With further reference to FIG. 2, the system 200 may also include a security monitoring service 228. The security monitoring service 228 may be operated by the same company that manufactures, sells, and/or distributes the A/V devices 210, the hub device 202, the VA device 208, the sensors 204, and/or the automation devices 206. In additional implementations, the security monitoring service 228 may be operated by a third-party company (e.g., a different company than the one that manufactured, sold, and/or distributed the A/V devices 210, the hub device 202, the VA device 208, the sensors 204, and/or the automation devices 206). In any of the present implementations, the security monitoring service 228 may have control of at least some of the features and components of the security system and/or the home-automation system (e.g., the security monitoring service 228 may be able to arm and/or disarm the security system, lock and/or unlock doors, activate and/or deactivate one or more of the sensors 204 and/or the automation devices 206, etc.). For example, the security monitoring service 228 may operate and control their own client devices and/or network of servers/backend devices for monitoring and/or controlling security systems. In such an example, the A/V devices 210, the hub device 202, the VA device 208, the sensors 204, and/or the automation devices 206 may communicate with the client devices and/or one or more components of the network of servers/backend devices of the security monitoring service 228 over the network (Internet/PSTN) 212 (in some implementations, via one or more of the components of the network of backend servers/backend devices 220).

Figure 3:
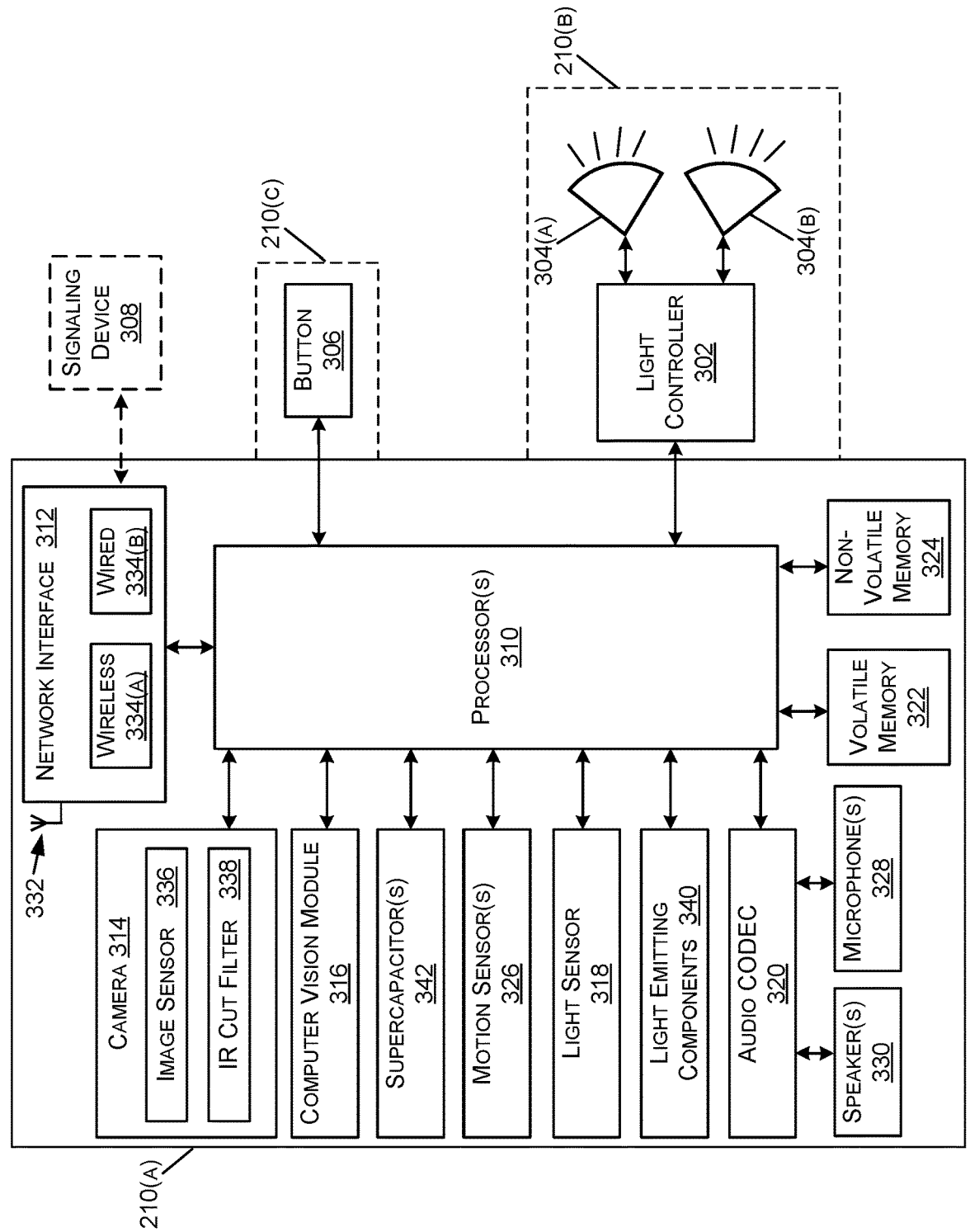
FIG. 3 is a functional block diagram illustrating an A/V recording and communication doorbell device ("A/V doorbell") according to various aspects of the present disclosure.

FIG. 3 is a functional block diagram for an audio/video (A/V) device according to various aspects of the present disclosure. In some implementations, the one or more A/V devices 210 may include the security camera 210(*a*). In other implementations, the one or more A/V devices 210 may include the light camera 210(*b*), which may include some or all of the components of the security camera 210(*a*) in addition to a light controller 302 and one or more lights 304(*a*), 304(*b*). In some implementations, the one or more A/V devices 210 may include the video doorbell 210(*c*), which may include some or all of the components of the security camera 210(*a*) in addition to a button 306, and in some implementations, a connection to a signaling device 308 (e.g., a pre-installed signaling device, such as a wired signaling device, and/or a wireless signaling device, connected over Wi-Fi, BLE, or another wireless communication protocol). In illustrative implementations, the A/V doorbell 102 of FIG. 1 may include some or all of the components included in the A/V device of FIG. 3 and the signaling device 308 may correspond to the signaling device 114 of FIG. 1.

With further reference to FIG. 3, the A/V device 210 may include a processor(s) 310, a network interface 312, a camera 314, a computer vision module 316, a light sensor 318, an audio CODEC (coder-decoder) 320, volatile memory 322, and non-volatile memory 324. The processor(s) 310 (alternatively referred to herein as a "CPU," a "controller," and/or a "microcontroller") may comprise an integrated circuit including a processor core, memory, and programmable input/output peripherals. The processor(s) 310 may receive input signals, such as data and/or power, from the camera 314, motion sensor(s) 326, light sensor 318, microphone(s) 328, speaker(s) 330, and/or the network interface 312, and may perform various functions as described in the present disclosure. In various implementations, when the processor(s) 310 is triggered by the motion sensor(s) 326, the camera 314, the speaker(s) 330, the microphone(s) 328, the network interface 312, and/or another component, the processor(s) 310 performs one or more processes and/or functions. For example, when the light sensor 318 detects a low level of ambient light, the light sensor 318 may trigger the processor(s) 310 to enable a night vision camera mode. The processor(s) 310 may also provide data communication between various components such as between the network interface 312 and the camera 314.

With further reference to FIG. 3, the network interface 312 may comprise an integrated circuit including a processor core, memory, and programmable input/output peripherals. The network interface 312 may be operatively connected to the processor(s) 310. In some implementations, the network interface 312 is configured to handle communication links between the A/V device 210 and other, external devices, external receivers, external transmitters, and/or external transceivers, and to route incoming/outgoing data appropriately. For example, inbound data from an antenna 332 of the network interface 312 may be routed through the network interface 312 before being directed to the processor(s) 310, and outbound data from the processor(s) 310 may be routed through the network interface 312 before being directed to the antenna 332 of the network interface 312. As another example, the network interface 312 may be configured to transmit data to and/or receive data from a remote network device (e.g., one or more components of the network(s) of servers/backend devices 220 described in FIG. 2). The network interface 312 may include wireless 334(a) and wired 334(b) adapters. For example, the network interface 312 may include one or more wireless antennas, radios, receivers, transmitters, and/or transceivers (not shown in FIG. 3 for simplicity) configured to enable communication across one or more wireless networks, such as, without limitation, Wi-Fi, cellular, Bluetooth, Z-Wave, Zigbee, LPWAN(s), and/or satellite networks. The network interface 312 may receive inputs, such as power and/or data, from the camera 314, the processor(s) 310, the button 306 (in implementations where the A/V device 210 is the video doorbell 210(c)), the motion sensors 326, a reset button (not shown in FIG. 3 for simplicity), and/or the non-volatile memory 324. The network interface 312 may also include the capability of communicating over wired connections, such as with a signaling device 308. For example, when the button 306 of the video doorbell 210(c) is pressed, the network interface 312 may be triggered to perform one or more functions, such as to transmit a signal over the wired 334(b) connection to the signaling device 308 (although, in some implementations, the signal be transmitted over a wireless 334(a) connection to the signaling device) to cause the signaling device 308 to emit a sound (e.g., a doorbell tone, a user customized sound, a ringtone, a seasonal ringtone, etc.). The network interface 312 may also act as a conduit for data communicated between various components and the processor(s) 310.

With further reference to FIG. 3, the A/V device 210 may include the non-volatile memory 324 and the volatile memory 322. The non-volatile memory 324 may comprise flash memory configured to store and/or transmit data. For example, in certain implementations the non-volatile memory 324 may comprise serial peripheral interface (SPI) flash memory. In some implementations, the non-volatile memory 324 may comprise, for example, NAND or NOR flash memory. The volatile memory 322 may comprise, for example, DDR3 SDRAM (double data rate type three synchronous dynamic random-access memory). In the implementation illustrated in FIG. 3, the volatile memory 322 and the non-volatile memory 324 are illustrated as being separate from the processor(s) 310. However, the illustration of FIG. 3 is not intended to be limiting, and in some implementations the volatile memory 322 and/or the non-volatile memory 324 may be physically incorporated with the processor(s) 310, such as on the same chip. The volatile memory 322 and/or the non-volatile memory 324, regardless of their physical location, may be shared by one or more other components (in addition to the processor(s) 310) of the present A/V device 210.

With further reference to FIG. 3, the A/V device 210 may include the camera 314. The camera 314 may include an image sensor 336. The image sensor 336 may include a video recording sensor and/or a camera chip. In one aspect of the present disclosure, the imager sensor 336 may comprise a complementary metal-oxide semiconductor (CMOS) array and may be capable of recording high definition (e.g., 722p, 1800p, 4K, etc.) video files. The camera 314 may include a separate camera processor (not shown in FIG. 3 for simplicity), or the processor(s) 310 may perform the camera processing functionality. The processor(s) 310 (and/or camera processor) may include an encoding and compression chip. In some implementations, the processor(s) 310 (and/or the camera processor) may comprise a bridge processor. The processor(s) 310 (and/or the camera processor) may process video recorded by the image sensor 336 and/or audio recorded by the microphone(s) 328, and may transform this data into a form suitable for transfer by the network interface 312 to the network (Internet/PSTN) 212. In various implementations, the camera 314 also includes memory, such as volatile memory that may be used when data is being buffered or encoded by the processor(s) 310 (and/or the camera processor). For example, in certain implementations the camera memory may comprise synchronous dynamic random-access memory (SD RAM).

The camera 314 may further include an IR cut filter 338 that may comprise a system that, when triggered, configures the image sensor 336 to see primarily infrared light as opposed to visible light. For example, when the light sensor 318 detects a low level of ambient light (which may comprise a level that impedes the performance of the image sensor 336 in the visible spectrum), the light emitting components 340 may shine infrared light through an enclosure of the A/V device 210 out to the environment, and the IR cut filter 338 may enable the image sensor 336 to see this infrared light as it is reflected or refracted off of objects within the field of view of the doorbell. This process may provide the A/V device with the "night vision" function mentioned above.

With further reference to FIG. 3, the recording and communication A/V device 210 may comprise the light sensor 318 and the one or more light-emitting components 340, such as LED's. The light sensor 318 may be one or more sensors capable of detecting the level of ambient light of the surrounding environment in which the A/V device 210 may be located. The light-emitting components 340 may be one or more light-emitting diodes capable of producing visible light when supplied with power (e.g., to enable night vision). In some implementations, when activated, the light-emitting components 340 illuminates a light pipe.

The A/V device 210 may further include one or more speaker(s) 330 and/or one or more microphone(s) 328. The speaker(s) 330 may be any electromechanical device capable of producing sound in response to an electrical signal input. The microphone(s) 328 may be an acoustic-to-electric transducer or sensor capable of converting sound waves into an electrical signal. In some implementations, the A/V device 210 may include two or more microphone(s) 328 that are spaced from one another (e.g., located on different sides of the A/V device 210) to provide noise cancelling and/or echo cancelling for clearer audio. The speaker(s) 330 and/or microphone(s) 328 may be coupled to an audio CODEC 320 to enable digital audio received by client devices to be decompressed and output by the speaker(s) 330 and/or to enable audio data captured by the microphone(s) 328 to be compressed into digital audio data. The digital audio data may be received from and transmitted to client devices using the network interface 312 (in some implementations, through one or more intermediary devices such as the hub device 202, the VA device 208, and/or one or more components of the network of servers/backend devices 220 as described in FIG. 2). For example, when a visitor (or intruder) who is present in the area about the A/V device 210 speaks, sound from the visitor (or intruder) is received by the microphone(s) 328 and compressed by the audio CODEC 320. Digital audio data is then sent through the network interface 312 to the network 212 via the user's network 218, routed by the backend server 224 and/or the backend API 226 and delivered to the client device(s) 214, 216 as described above in connection with FIG. 2. When the user speaks, after being transferred through the network 212, the user's network 218, and the network interface 312, the digital audio data from the user is decompressed by the audio CODEC 320 and emitted to the visitor through the speaker(s) 330.

With further reference to FIG. 3, the A/V device 210 may be powered using one or more supercapacitors 342 and/or may be powered using a source of external AC (alternating-current) power, such as a household AC power supply (alternatively referred to herein as "AC mains" or "wall power"). The AC power may have a voltage in the range of 110-220 VAC, for example. The incoming AC power may be received by an AC/DC adapter (not shown), which may convert the incoming AC power to DC (direct-current) and may step down the voltage from 110-220 VAC to a lower output voltage of about 12 VDC and an output current of about 2 A, for example. In various implementations, the output of the AC/DC adapter is in a range from about 9 V to about 15 V and in a range from about 0.5 A to about 5 A. These voltages and currents are examples provided for illustration and are not intended to be limiting.

In implementations described herein, a battery may not be included in the A/V device 210. In various implementations, the A/V device 210 may include an integrated circuit (not shown) capable of arbitrating between multiple voltage rails, thereby selecting the source of power for the A/V device 210. The A/V device 210 may have separate power rails dedicated to the one or more supercapacitors 342 and the AC power source. In one aspect of the present disclosure, the A/V device 210 may continuously draw power from the AC power to power the A/V device 210, while only drawing from the one or more supercapacitors 342 when the AC power is low or insufficient. Still, in some implementations, the one or more supercapacitors 342 comprises the sole source of power for the A/V device 210.

Although not illustrated in FIG. 3, in some implementations, the A/V device 210 may include one or more of an accelerometer, a barometer, a humidity sensor, and a temperature sensor. The accelerometer may be one or more sensors capable of sensing motion and/or acceleration. The one or more of the accelerometer, the barometer, the humidity sensor, and the temperature sensor may be located outside of a housing of the A/V device 210 so as to reduce interference from heat, pressure, moisture, and/or other stimuli generated by the internal components of the A/V device 210.

With further reference to FIG. 3, the A/V device 210 may include one or more motion sensor(s) 326. However, in some implementations, the motion sensor(s) 326 may not be included, such as where motion detection is performed by the camera 314 or another device. The motion sensor(s) 326 may be any type of sensor capable of detecting and communicating the presence of an entity within their field of view. As such, the motion sensor(s) 326 may include one or more (alone or in combination) different types of motion sensors. For example, in some implementations, the motion sensor(s) 326 may comprise passive infrared (PIR) sensors, which may be secured on or within a PR sensor holder that may reside behind a lens (e.g., a Fresnel lens). In such an example, the PIR sensors may detect IR radiation in a field of view, and produce an output signal (typically a voltage) that changes as the amount of IR radiation in the field of view changes. The amount of voltage in the output signal may be compared, by the processor(s) 310, for example, to one or more threshold voltage values to determine if the amount of voltage in the output signal is indicative of motion, and/or if the amount of voltage in the output signal is indicative of motion of an entity that is to be captured by the camera 314 (e.g., motion of a person and/or animal may prompt activation of the camera 314, while motion of a vehicle may not). Although the above discussion of the motion sensor(s) 326 primarily relates to PIR sensors, depending on the implementation, the motion sensor(s) 326 may include additional and/or alternate sensor types that produce output signals including alternative data types. For example, and without limitation, the output signal may include an amount of voltage change based on the presence of infrared radiation in a field of view of an active infrared (AIR) sensor, the output signal may include phase shift data from a microwave-type motion sensor, the output signal may include doppler shift data from an ultrasonic-type motion sensor, the output signal may include radio wave disturbance from a tomographic-type motion sensor, and/or the output signal may include other data types for other sensor types that may be used as the motion sensor(s) 326 of the A/V device 210.

In some implementations, computer vision module(s) (CVM) 316 may be included in the A/V device 210 as the motion sensor(s) 326, in addition to, or alternatively from, other motion sensor(s) 326. For example, the CVM 316 may be a low-power CVM (e.g., Qualcomm Glance) that, by operating at low power (e.g., less than 2 mW of end-to-end power), is capable of providing computer vision capabilities and functionality for battery powered devices (e.g., the A/V device 210 when powered by the one or more supercapacitors 342). The low-power CVM may include a lens, a CMOS image sensor, and a digital processor that may perform embedded processing within the low-power CVM itself, such that the low-power CVM may output post-processed computer vision metadata to the processor(s) 310 (e.g., via a serial peripheral bus interface (SPI)). As such, the low-power CVM may be considered to be one or more of the motion sensor(s) 326, and the data type output in the output signal may be the post-processed computer vision metadata. The metadata may include information such as the presence of a particular type of entity (e.g., person, animal, vehicle, parcel, etc.), a direction of movement of the entity, a distance of the entity from the A/V device 210, etc. In various implementations, the motion sensor(s) 326 include a plurality of different sensor types capable of detecting motion such as PIR, AIR, low-power CVM, and/or cameras.

As indicated above, the A/V device 210 may include the CVM 316 (which may be the same as the above described low-power CVM 316 implemented as one or more motion sensor(s) 326, or may be additional to, or alternative from, the above described low-power CVM 316). For example, the A/V device 210, the hub device 202, the VA device 208, and/or one or more component of the network(s) of servers/backend devices 220 may perform any or all of the computer vision processes and functionalities described herein. In addition, although the CVM 316 is only illustrated as a component of the A/V device 210, the computer vision module 316 may additionally, or alternatively, be included as a component of the hub device 202, the VA device 208, and/or one or more components of the network of servers/backend devices 220. With respect to the A/V device 210, the CVM 316 may include any of the components (e.g., hardware) and/or functionality described herein with respect to computer vision, including, without limitation, one or more cameras, sensors, and/or processors. In some of the present implementations, with reference to FIG. 3, the microphone(s) 328, the camera 314, the processor(s) 310, and/or the image sensor 336 may be components of the CVM 316. In some implementations, the CVM 316 may include an internal camera, image sensor, and/or processor, and the CVM 316 may output data to the processor(s) 310 in an output signal, for example.

As a result of including the CVM 316, some of the present implementations may leverage the CVM 316 to implement computer vision for one or more aspects, such as motion detection, object recognition, and/or facial recognition. Computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Image acquisition—A digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance.

Pre-processing—Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales.

Feature extraction—Image features at various levels of complexity are extracted from the image data. Typical examples of such features are: Lines, edges, and ridges; Localized interest points such as corners, blobs, or points; More complex features may be related to texture, shape, or motion.

Detection/segmentation—At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy).

High-level processing—At this step, the input may be a small set of data, for example a set of points or an image region that is assumed to contain a specific object. The remaining processing may comprise, for example: Verification that the data satisfy model-based and application-specific assumptions; Estimation of application-specific parameters, such as object pose or object size; Image recognition—classifying a detected object into different categories; Image registration—comparing and combining two different views of the same object.

Decision making—Making the final decision required for the application, for example match/no-match in recognition applications.

One or more of the present implementations may include a vision processing unit (not shown separately, but may be a component of the CVM 316). A vision processing unit is an emerging class of microprocessor; it is a specific type of AI (artificial intelligence) accelerator designed to accelerate machine vision tasks. Vision processing units are distinct from video processing units (which are specialized for video encoding and decoding) in their suitability for running machine vision algorithms such as convolutional neural networks, SIFT, etc. Vision processing units may include direct interfaces to take data from cameras (bypassing any off-chip buffers), and may have a greater emphasis on on-chip dataflow between many parallel execution units with scratchpad memory, like a manycore DSP (digital signal processor). But, like video processing units, vision processing units may have a focus on low precision fixed-point arithmetic for image processing.

Some of the present implementations may use facial recognition hardware and/or software, as a part of the computer vision system. Various types of facial recognition exist, some or all of which may be used in the present implementations.

Some facial recognition algorithms identify facial features by extracting landmarks, or features, from an image of the subject's face. For example, an algorithm may analyze the relative position, size, and/or shape of the eyes, nose, cheekbones, and jaw. These features are then used to search for other images with matching features. Other algorithms normalize a gallery of face images and then compress the face data, only saving the data in the image that is useful for face recognition. A probe image is then compared with the face data. One of the earliest successful systems is based on template matching techniques applied to a set of salient facial features, providing a sort of compressed face representation.

Recognition algorithms can be divided into two main approaches, geometric, which looks at distinguishing features, or photometric, which is a statistical approach that distills an image into values and compares the values with templates to eliminate variances.

Popular recognition algorithms include principal component analysis using eigenfaces, linear discriminant analysis, elastic bunch graph matching using the Fisherface algorithm, the hidden Markov model, the multilinear subspace learning using tensor representation, and the neuronal motivated dynamic link matching.

Further, a newly emerging trend, claimed to achieve improved accuracy, is three-dimensional face recognition. This technique uses 3D sensors to capture information about the shape of a face. This information is then used to identify distinctive features on the surface of a face, such as the contour of the eye sockets, nose, and chin.

One advantage of 3D face recognition is that it is not affected by changes in lighting like other techniques. It can also identify a face from a range of viewing angles, including a profile view. Three-dimensional data points from a face vastly improve the precision of face recognition. 3D research is enhanced by the development of sophisticated sensors that do a better job of capturing 3D face imagery. The sensors work by projecting structured light onto the face. Up to a dozen or more of these image sensors can be placed on the same CMOS chip—each sensor captures a different part of the spectrum.

Another variation is to capture a 3D picture by using three tracking cameras that point at different angles; one camera pointing at the front of the subject, a second one to the side, and a third one at an angle. All these cameras work together to track a subject's face in real time and be able to face detect and recognize.

Another emerging trend uses the visual details of the skin, as captured in standard digital or scanned images. This technique, called skin texture analysis, turns the unique lines, patterns, and spots apparent in a person's skin into a mathematical space.

Another form of taking input data for face recognition is by using thermal cameras, which may only detect the shape of the head and ignore the subject accessories such as glasses, hats, or make up.

Further examples of automatic identification and data capture (AIDC) and/or computer vision that can be used in the present implementations to verify the identity and/or authorization of a person include, without limitation, biometrics. Biometrics refers to metrics related to human characteristics. Biometrics authentication (or realistic authentication) is used in various forms of identification and access control. Biometric identifiers are the distinctive, measurable characteristics used to label and describe individuals. Biometric identifiers can be physiological characteristics and/or behavioral characteristics. Physiological characteristics may be related to the shape of the body. Examples include, but are not limited to, fingerprints, palm veins, facial recognition, three-dimensional facial recognition, skin texture analysis, DNA, palm prints, hand geometry, iris recognition, retina recognition, and odor/scent recognition. Behavioral characteristics may be related to the pattern of behavior of a person, including, but not limited to, typing rhythm, gait, and voice recognition.

The present implementations may use any one, or any combination of more than one, of the foregoing biometrics to identify and/or authenticate a person who is either suspicious or who is authorized to take certain actions with respect to a property or expensive item of collateral. For example, with reference to FIG. 3, the CVM 316, and/or the camera 314 and/or the processor(s) 310 may receive information about the person using any one, or any combination of more than one, of the foregoing biometrics.

Again, with reference to FIG. 3, in implementations where the A/V device 210 includes a light camera, the A/V device 210 may include the light controller 302 and one or more lights 304(*a*), 304(*b*) (collectively referred to herein as "lights 304"). The light controller 302 may include a switch for controlling the lights 304. For example, in response to the motions sensor(s) 326 and/or the camera 314 detecting motion, the light controller 236 may receive an output signal from the processor(s) 310 that causes the light controller 302 to activate the one or more lights 304(*a*), 304(*b*). In some implementations, the light camera may include motion sensor(s) 326 detecting motion for controlling activation of the lights 304, and may further include the camera 314 for detecting motion for activating the recording of the image data using the camera 314 and/or the recording of the audio data using the microphone(s) 328. In other implementations, the motion sensor(s) 326 may detect the motion for activating the lights 304, the camera 314, and the microphone(s) 328, or the camera 314 may detect the motion for activating the lights 304, the camera 314 to being recording the image data, and the microphone(s) 328 to being recording the audio data. The lights 304 may include floodlights, spotlights, porch lights, or another type of illumination device. The lights 304 may provide for better image data quality when ambient light levels are low (e.g., at dusk, dawn, or night), while also providing a deterrent effect by being illuminated when motion is detected.

With further reference to FIG. 3, in implementations where the A/V device 210 includes a doorbell, such as the video doorbell 210(c), the A/V device 210 may include the button 306. In implementations where the button 306 is a mechanical button (e.g., has a range of movement), the button 306 may make contact with a button actuator located within the video doorbell 210(c) when the button 306 is pressed. In implementations where the button 306 is not mechanical (e.g., has no range of motion), the button 306 may include a capacitive touch button, a resistive touch button, a surface acoustic wave (SAW) button, an infrared (IR) button, an optical imaging button, an acoustic pulse recognition button, and/or a button that implements a low-power CVM for the detection of a person (e.g., a finger, hand, etc., of a person). When the button 306 is pressed, touched, and/or otherwise triggered, the processor(s) 310 may receive an output signal from the button 306 that may activate one or more functions of the video doorbell 210(c), such as transmitting an output signal, using the network interface 312, to the signaling device 308 to cause the signaling device 308 to output a sound (e.g., via the wired 334(b) connection to the signaling device 308 and/or a wireless 334(a) connection to the signaling device 308). In addition, the processor(s) 310 may transmit an output signal (e.g., a message), using the network interface 312, to the client device(s) 214, 216 to indicate to the user(s) of the client device(s) 214, 216 that a person is present at the A/V device 210 (in some implementations, via at least one of the hub device 202, the VA device 208, and/or one or more component of the network of servers/backend devices 220).

Although the A/V recording and communication device 210 (or A/V device 210) is referred to herein as an "audio/video" device, the A/V device 210 need not have both audio and video functionality. For example, in some implementations, the A/V device 210 may not include the speakers 330, microphones 328, and/or audio CODEC. In such examples, the A/V device 210 may only have video recording and communication functionalities. In other examples, the A/V device 210 may only have the speaker(s) 330 and not the microphone(s) 328, or may only have the microphone(s) 328 and not the speaker(s) 330.

Figure 4:
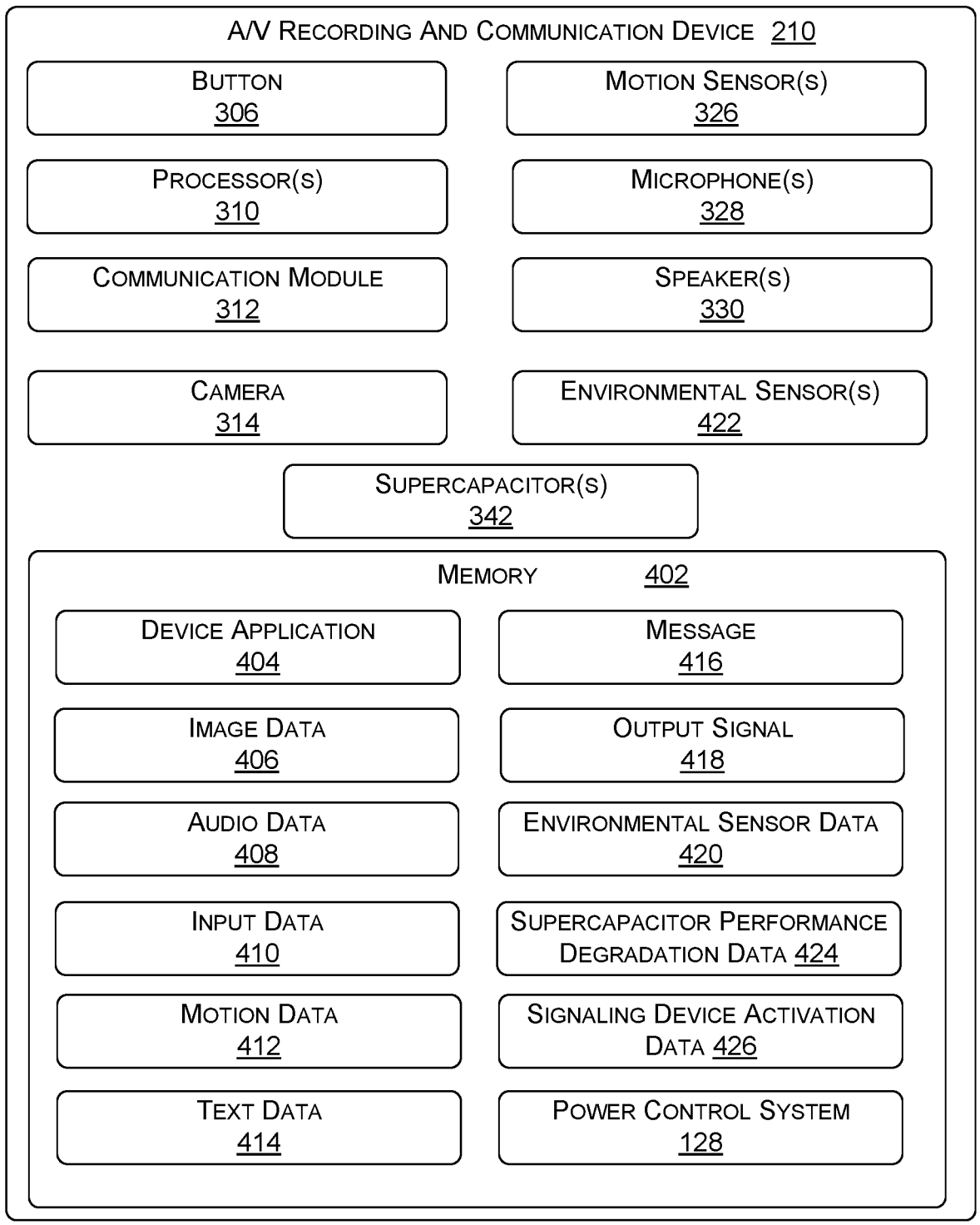
FIG. 4 is a functional block diagram illustrating one example implementation of an A/V doorbell according to various aspects of the present disclosure.

FIG. 4 is another functional block diagram illustrating an implementation of the A/V device 210 according to various aspects of the present disclosure. In some implementations, the A/V device 210 may represent, and further include one or more of the components from, the A/V recording and communication doorbell 210(c), the A/V recording and communication security camera 210(a), and/or the floodlight controller 210(b). Additionally, in some implementations, the A/V device 210 may omit one or more of the components shown in FIG. 4 and/or may include one or more additional components not shown in FIG. 4.

As shown in FIG. 4, the A/V device 210 includes memory 402, which may represent the volatile memory 322 and/or the non-volatile memory 324. The memory 402 stores a device application 404. In various implementations, the device application 404 may configure the processor(s) 310 to capture image data 406 using the camera 314, audio data 408 using the microphone(s) 328, input data 410 using the button 306 (and/or the camera 314 and/or the motion sensor(s) 326, depending on the implementation), and/or motion data 412 using the camera 314 and/or the motion sensor(s) 326. In some implementations, the device application 404 may also configure the processor(s) 310 to generate text data 414 describing the image data 406, the audio data 408, and/or the input data 410, such as in the form of metadata, for example.

In addition, the device application 404 may configure the processor(s) 310 to transmit the image data 406, the audio data 408, the motion data 412, the input data 410, the text data 414, and/or message(s) 416 to the client devices 214, 216, the hub device 202, and/or the backend server 224 using the network interface 312. In various implementations, the device application 404 may also configure the processor(s) 310 to generate and transmit an output signal 418 that may include the image data 406, the audio data 408, the text data 414, the input data 410, and/or the motion data 412. In some of the present implementations, the output signal 418 may be transmitted to the backend server 224 and/or the hub device 202 using the network interface 312. The backend server 224 may then transmit (or forward) the output signal 418 to the client device(s) 214, 216, and/or the hub device 202 may then transmit (or forward) the output signal 418 to the client device(s) 214, 216, and/or the hub device 202 may then transmit (or forward) the output signal 418 to the backend server 224, and the backend server 224 may then transmit (or forward) the output signal 418 to the client device(s) 214, 216. In other implementations, the output signal 418 may be transmitted directly to the client device(s) 214, 216 by the A/V device 210.

In further reference to FIG. 4, the image data 406 may comprise image sensor data such as (but not limited to) exposure values and data regarding pixel values for a particular sized grid. The image data 406 may include still images, live video, and/or pre-recorded images and/or video. The image data 406 may be recorded by the camera 314 in a field of view of the camera 314. The image data 406 may be representative of (e.g., depict) a physical environment in a field of view of the camera 406. In some implementations, the physical environment may include one or more objects (e.g., persons, vehicles, animals, items, etc.), and the image data 406 may be representative of the one or more objects, such as the one or more objects within the physical environment.

In further reference to FIG. 4, the motion data 412 may comprise motion sensor data generated in response to motion events. For example, the motion data 412 may include an amount or level of a data type generated by the motion sensor(s) 326 (e.g., the voltage level output by the motion sensor(s) 326 when the motion sensor(s) 326 are PIR type motion sensor(s)). In some of the present implementations, such as those where the A/V device 210 does not include the motion sensor(s) 326, the motion data 412 may be generated by the camera 314. In such implementations, based on a frame by frame comparison of changes in the pixels from the image data 406, it may be determined that motion is present.

The input data 410 may include data generated in response to an input to the button 306. The button 306 may receive an input (e.g., a press, a touch, a series of touches and/or presses, etc.) and may generate the input data 410 in response that is indicative of the type of input.

With further reference to FIG. 4, a message 416 may be generated by the processor(s) 310 and transmitted, using the network interface 312, to the client device 214, 216, the backend server 224, and/or the hub device 202. For example, in response to detecting motion using the camera 314 and/or the motion sensor(s) 326, the A/V device 210 may generate and transmit the message 416. In some of the present implementations, the message 416 may include at least the image data 406, the audio data 408, the text data 414, and/or the motion data 412.

As described herein, the message(s) 416 may include alerts, signals, data, notifications, and/or any type of electronic communication that electronic devices (e.g., the A/V device 210, the client device 214, 216, the hub device 202, and/or one or more components of the network(s) of servers/backend devices 220) may transmit and receive with other electronic devices (e.g., the A/V device 210, the client device 214, 216, the hub device 202, and/or one or more components of the network(s) of servers/backend devices 220). For instance, message(s) 416 may include push notifications, email messages, short message service (SMS) messages, multimedia messages (MMS), voicemail messages, video signals, audio signals, data transmissions, and/or any other type of electronic communication that an electronic device can send to another electronic device.

The image data 406, the audio data 408, the text data 414, and/or the motion data 412 may be tagged with (e.g., a time stamp, based on clock data) and/or stored separately (e.g., on the backend server 224, the hub device 202, and/or the A/V device 210) based on when the motion was detected, how long the motion was detected for, and/or a duration of time associated with the detected motion, or motion event (e.g., the duration of time may include the time the motion was detected plus an additional time, such as, without limitation, 5 seconds, 10 seconds, or 30 seconds). For example, each separate detection of motion, or motion event, may be associated with image data 406, audio data 408, text data 414, and/or motion data 412 representative of the detection of motion, or motion event. As a result, when a request for data pertaining to particular motion event, or a particular time period, is received (e.g., by the client device 214, 216, the backend server 224, and/or the hub device 202), the image data 406, the audio data 408, the text data 414, and/or the motion data 412 associated with a particular motion event, and/or associated with motion event(s) within the particular time period, may be transmitted, retrieved, and/or received.

Although examples discuss the A/V device 210 generating and transmitting the image data 406, the audio data 408, the text data 414, and/or the motion data 412 when motion is detected (e.g., in the message 416), in other examples the data may be generated and/or transmitted at other times. For example, the image data 406, the audio data 408, the text data 414, and/or the motion data 412 may be generated and transmitted continuously (e.g., in a streaming manner), periodically, upon request, etc. In examples where the image data 406, the audio data 408, the text data 414, and/or the motion data 412 may be generated and transmitted continuously, the detection of motion (e.g., a motion event) may cause an indication of when the motion was detected (e.g., a time stamp) and/or how long the motion was detected for (e.g., a duration) to be associated with the image data 406, the audio data 408, the text data 414, and/or the motion data 412. As a result, even though the image data 406, the audio data 408, the text data 414, and/or the motion data 412 may be continuously generated by the A/V device 210, the image data 406, the audio data 408, the text data 414, and/or the motion data 412 associated with motion events may be tagged and/or stored separately (e.g., similar to that of the image data 406, the audio data 408, the text data 414, and/or the motion data 412 generated in response to the detection of motion), from the image data 406, the audio data 408, the text data 414, and/or the motion data 412 that is not associated with motion events.

As described herein, at least some of the processes of the backend server 224, the hub device 202, and/or the client device 214, 216 may be executed by the A/V device 210. In particular implementations, the memory 402 may also store environmental sensor data 420. The environmental sensor data 420 may be obtained from one or more environmental sensors 422 of the A/V device 420. The environmental sensors 422 may include a temperature sensor, a moisture sensor, and/or a barometric pressure sensor. In various implementations, the environmental sensors 422 may produce the environmental sensor data 420 that includes temperature values indicating an ambient temperature that is outside of a structure and proximate to the A/V device 210. The environmental sensor data 420 may also include relative humidity values corresponding to ambient relative humidity with respect to the A/V device 210. Additionally, the environmental sensor data 420 may also include barometric pressure readings corresponding to barometric pressure values corresponding to ambient barometric pressure with respect to the A/V device 210.

Additionally, the memory 402 may store supercapacitor performance degradation data 424 that indicates an amount of degradation of individual supercapacitors of one or more supercapacitors 342 of the A/V device 210. In particular implementations, the supercapacitor performance degradation data 424 may correspond to a number of charge cycles and/or a number of discharge cycles of the one or more supercapacitors 342. In various implementations, the number of charge cycles and/or the number of discharge cycles of the one or more supercapacitors 342 may be tracked by the A/V device 210, such as by the power control system 128. The supercapacitor performance degradation data 424 may also include information corresponding to an amount of time to charge the one or more supercapacitors 342 and/or information corresponding to a rate of charge leakage for the one or more supercapacitors 342. The rate of charge leakage may be determined based on an amount of time that passes between a supercapacitor 342 being fully charged and the voltage of the supercapacitor 342 falling below a threshold voltage without a discharge event taking place. That is, the rate of charge leakage may correspond to a number of times or an amount of time between activations of a signaling device by the A/V device 210 where the voltage across the supercapacitor 342 falls below the threshold voltage. In additional implementations, the supercapacitor performance degradation data 424 may include information corresponding to a rate of discharge of the supercapacitors 342.

Further, the memory 402 may store signaling device activation data 426 that indicates an amount of time that a signaling device coupled to the A/V device is configured to produce sound in response to the button 306 being pressed. In certain implementations, the signaling device activation time may be determined based on input provided by a user indicating the signaling device activation time. In various implementations, the signaling device activation time may be entered via a user interface element included in a user interface displayed via a mobile device application. In additional implementations, the signaling device activation time may be a predetermined amount of time or a default amount of time.

The memory 402 also stores at least portions of the power control system 128. In particular implementations, the power control system 128 may determine voltages to apply to the one or more supercapacitors 342 in order to charge the one or more supercapacitors 342. The voltages applied to charge the one or more supercapacitors 342 may be based at least partly on at least one of the environmental sensor data 420, the supercapacitor performance degradation data 424, or the signaling device activation data 426. For example, as the environmental conditions surrounding the A/V device 210 change, the voltage applied to charge the one or more supercapacitors 342 may be modified by the power control system 128. To illustrate, as the ambient temperature around the A/V device 210 increases, the voltage applied to charge the one or more supercapacitors 342 may decrease to decrease the amount of degradation of the one or more supercapacitors 342. Additionally, as the performance degradation indicators indicate increasing degradation of the one or more supercapacitors 342, the power control system 128 may increase the voltage applied to charge the one or more supercapacitors 342 such that the one or more supercapacitors are charged to a level that can supply a sufficient amount of power to the functional components of the A/V device 210 during a time that power is drawn away from the A/V device 210 and supplied to a signaling device via doorbell power circuitry. Further, the power control system 128 may modify the voltage applied to charge the one or more supercapacitors 342 according to an amount of time that a signaling device coupled to the A/V device 210 is to produce sound. As the activation time of the signaling device increases, the power control system 128 may increase the voltage applied to charge the one or more supercapacitors 342 due to power being drawn away from the A/V device 210 for a longer period of time. In various implementations, the power control system 128 may determine different voltages to apply to charge various supercapacitors 342 of a group of supercapacitors. In an illustrative example, the power control system 128 may determine that different voltages are applied to charge different supercapacitors 342 due to differing performance degradation indicators for the individual supercapacitors 342.

Figure 5:
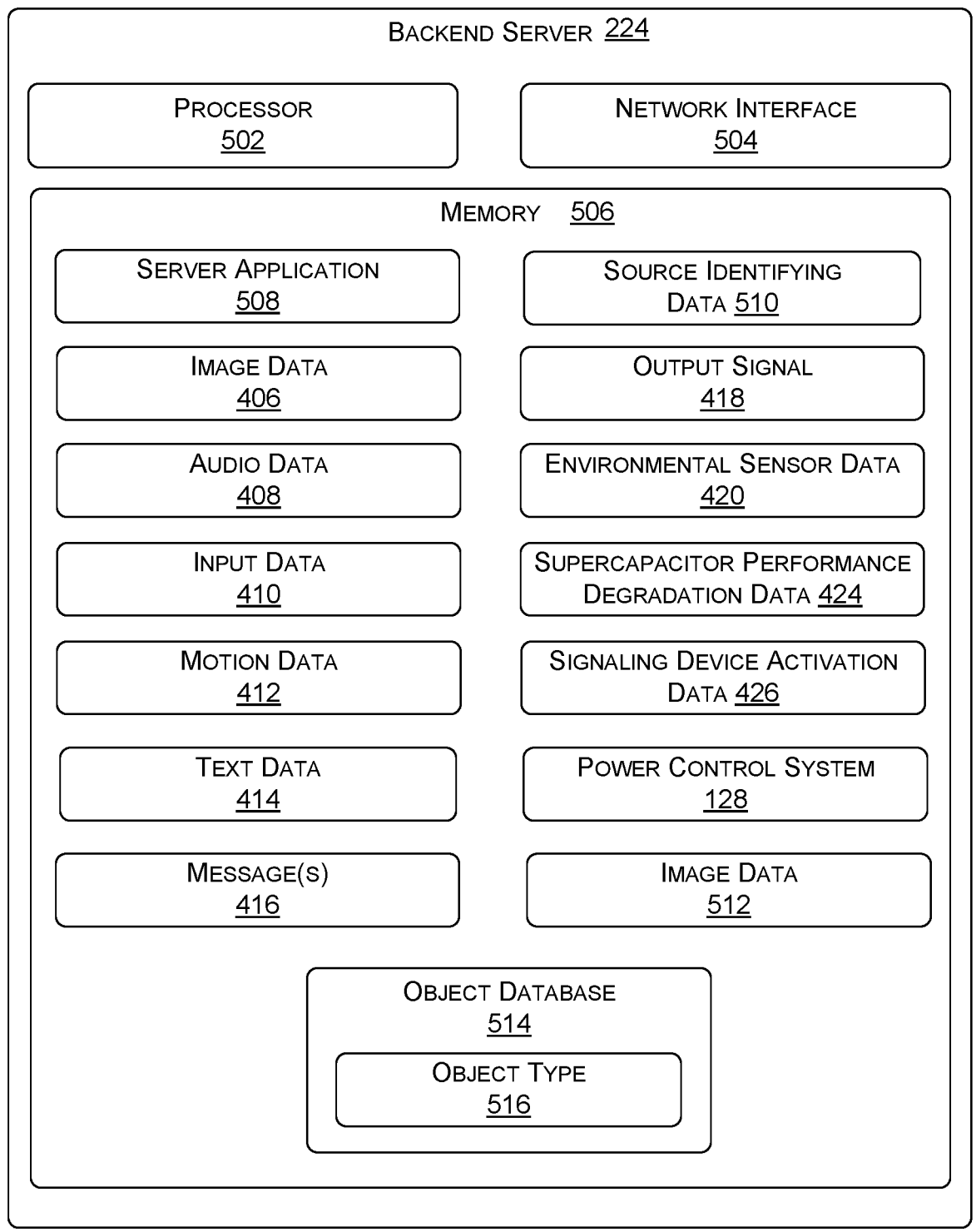
FIG. 5 is a functional block diagram illustrating one example implementation of a backend device according to various aspects of the present disclosure.

FIG. 5 is a functional block diagram illustrating one implementation of the backend server 224 according to various aspects of the present disclosure. The backend server 224 may comprise processor(s) 502 (which may be similar to, and/or include similar functionality as, the processor(s) 310), a network interface 504 (which may be similar to, and/or include similar functionality as, the network interface 312), and a memory 506 (which may be similar to, and/or include similar functionality as, the memory 402). The network interface 504 may allow the backend server 224 to access and communicate with devices connected to the network (Internet/PSTN) 212 (e.g., the A/V device 210, the hub device 202, the client devices 214, 216, a device controlled by the security monitoring service 228, the A/V devices 230, and/or the client devices 232).

The memory 506 may include a server application 508 that configures the processor(s) 502 to receive and/or retrieve the image data 406, the audio data 408, the input data 410, the motion data 412, the text data 414, and/or the messages 416, and/or from the A/V device 210 (e.g., in the output signal 418) and/or the hub device 202. The server application 508 may also configure the processor(s) 502 to transmit (and/or forward) the image data 406, the audio data 408, the input data 410, the motion data 412, the text data 414, and/or the messages 416 to the client devices 214, 216 using the network interface 504. Furthermore, the server application 508 may configure the processor(s) 502 to receive, using the network interface 504, image data 512 (also referred to as "second image data 512") generated by the A/V devices 230.

Although referred to as the backend server 224 with reference to the processes described herein, the backend server 224 may additionally, or alternatively, include one or more of the devices from the network(s) of servers/backend devices 220. For example, the processes described herein with respect to the backend server 224 may additionally, or alternatively, at least in part, be performed by one or more backend APIs 226.

In further reference to FIG. 5, the memory 506 may also include source identifying data 510 that may be used to identify the A/V device 210, the hub device 202, and/or the client devices 214, 216. In addition, the source identifying data 510 may be used by the processor(s) 502 of the backend server 224 to determine the client devices 214, 216 are associated with the A/V device 210 and/or the hub device 202.

In some implementations, the server application 508 may further configure the processor(s) 502 to generate and transmit a report signal (not shown) to a third-party client device (e.g., electronic device(s) 234), which may be associated with a law enforcement agency or the security monitoring service 228, for example. The report signal, which may be the message 416, in some examples, may include the image data 406, the audio data 408, the text data 414, and/or the second image data 512.

As described herein, at least some of the processes of the A/V device 210, the hub device 202, and/or the client device 214, 216 may be executed by the backend server 224. For example, the backend server 224 may store at least portions of the computer-readable instructions of the power control system 128 to determine voltages to apply to charge supercapacitors of one or more A/V devices 210. The memory 506 may store the environmental sensor data 420, the supercapacitor performance degradation data 424, and/or the signaling device activation data 426 that may be used by the power control system 128 to determine voltages to apply to charge supercapacitors of one or more A/V devices 210.

Although described as being performed in the backend server 224, in some implementations, the image data 406 may be analyzed by any of the A/V recording and communication device 210, the hub device 202, and/or the client device 214/216, in order to determine if the image data 406 depicts an object, therein. Thus, any or all of the operations described herein to analyze the image data 406 may be performed by any of these devices. To perform these operations, any or all of these devices may also include the object database 514, including the object type 516, and/or the image data 512, as described with reference to FIG. 5.

The hub device 202 and/or the backend server 224 (and/or one or more additional or alternative components of the network(s) of servers/backend devices 220) may alternatively be referred to herein as "network devices."

Figure 6:
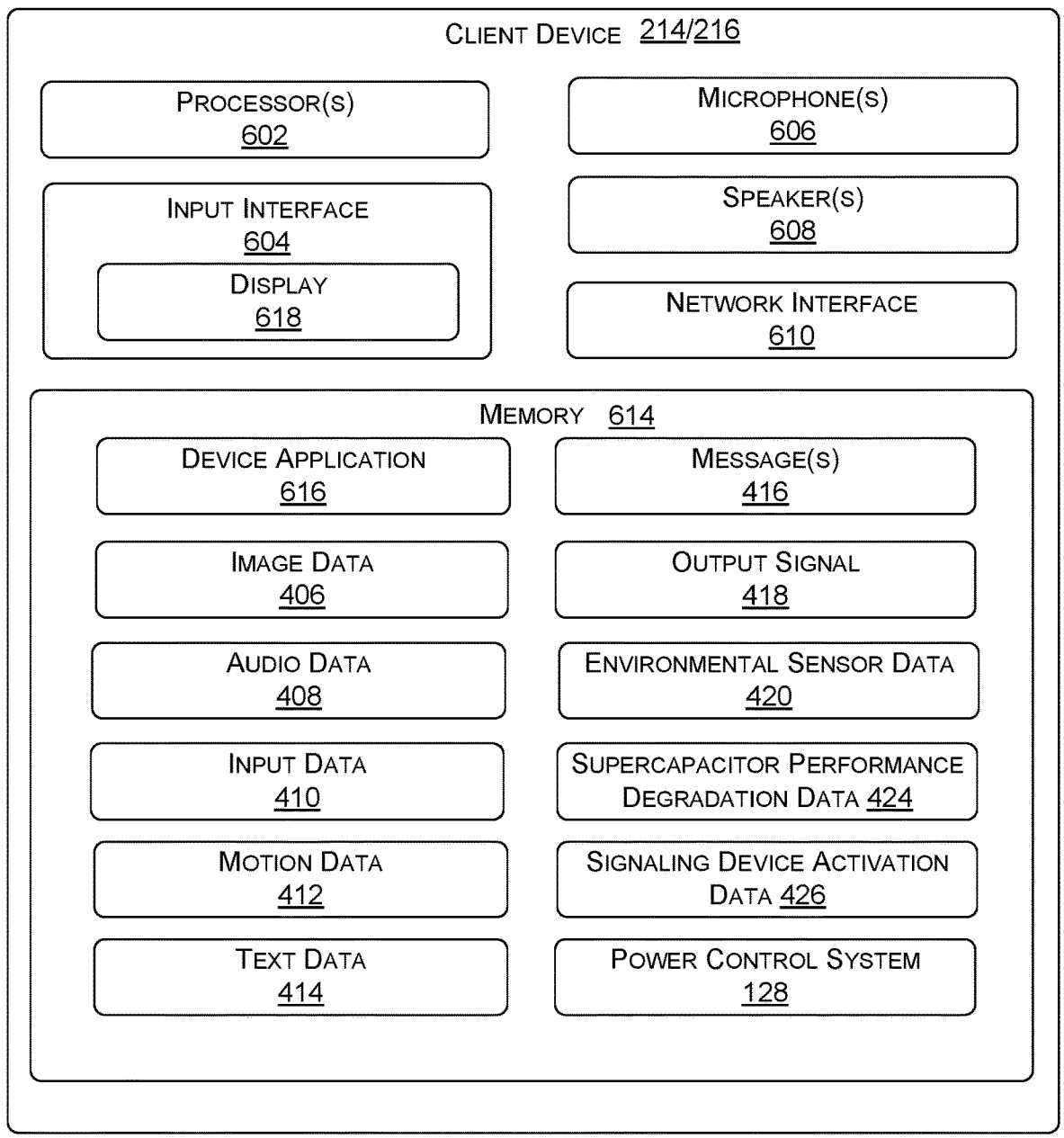
FIG. 6 is a functional block diagram illustrating one example implementation of a client device according to various aspects of the present disclosure.

Now referring to FIG. 6, FIG. 6 is a functional block diagram illustrating one implementation of the client device 214, 216, according to various aspects of the present disclosure. The client device 214, 216 may comprise processor(s) 602 (which may be similar to, and/or include similar functionality as, the processor(s) 310) that are operatively connected to an input interface 604, microphone(s) 606, speaker(s) 608, a network interface 610 (which may be similar to, and/or include similar functionality as, the network interface 312), and memory 612 (which may be similar to, and/or include similar functionality as, the memory 402).

The client device 214, 216 may further comprise a camera (not shown) operatively connected to the processor(s) 602.

The memory 612 may store a device application 614. In various implementations, the device application 614 may configure the processor(s) 602 to receive input(s) to the input interface 604. For example, the device application 614 may receive an input indicating an activation time for a signaling device 114 of the structure 102. In addition, the device application 614 may configure the processor(s) 602 to receive, using the network interface 610, the image data 406, the audio data 408, the input data 410, the motion data 412, the text data 414, the messages 416, and/or the output signal 418 from one or more of the A/V device 210, the hub device 202, or the backend server 224.

With further reference to FIG. 6, the input interface 604 may include a display 618. The display 618 may include a touchscreen, such that the user of the client device 214, 216 may provide inputs directly to the display 618 (e.g., an activation time for a signaling device, such as the signaling device 114). In some implementations, the client device 214, 216 may not include a touchscreen. In such implementations, and in implementations where the client device 214, 216 includes the touchscreen, the user may provide an input using any input device, such as, without limitation, a mouse, a trackball, a touchpad, a joystick, a pointing stick, a stylus, etc.

In some of the present implementations, in response to receiving a message 416, the device application 614 may configure the processor(s) 602 to cause the display 618 to display the message 416. The message 416 may indicate that the A/V device 210 detected motion, detected the presence of an object, received an input (e.g., to the button 306), etc. While displaying the message 416, the input interface 604 may receive input from the user to answer the message 416. In response, the device application 614 may configure the processor(s) 602 to display the received image data 406 on the display 618 (e.g., display image(s) and/or video footage represented by the image data 406).

As described herein, at least some of the processes of the A/V device 210, the hub device 202, and/or the backend server 224 may be executed by the client device 214, 216. For example, the client device 214/216 may store at least portions of the computer-readable instructions of the power control system 128 to determine voltages to apply to charge supercapacitors of one or more A/V devices 210. The memory 614 may store the environmental sensor data 420, the supercapacitor performance degradation data 424, and/or the signaling device activation data 426 that may be used by the power control system 128 to determine voltages to apply to charge supercapacitors of one or more A/V devices 210.

Figure 7:
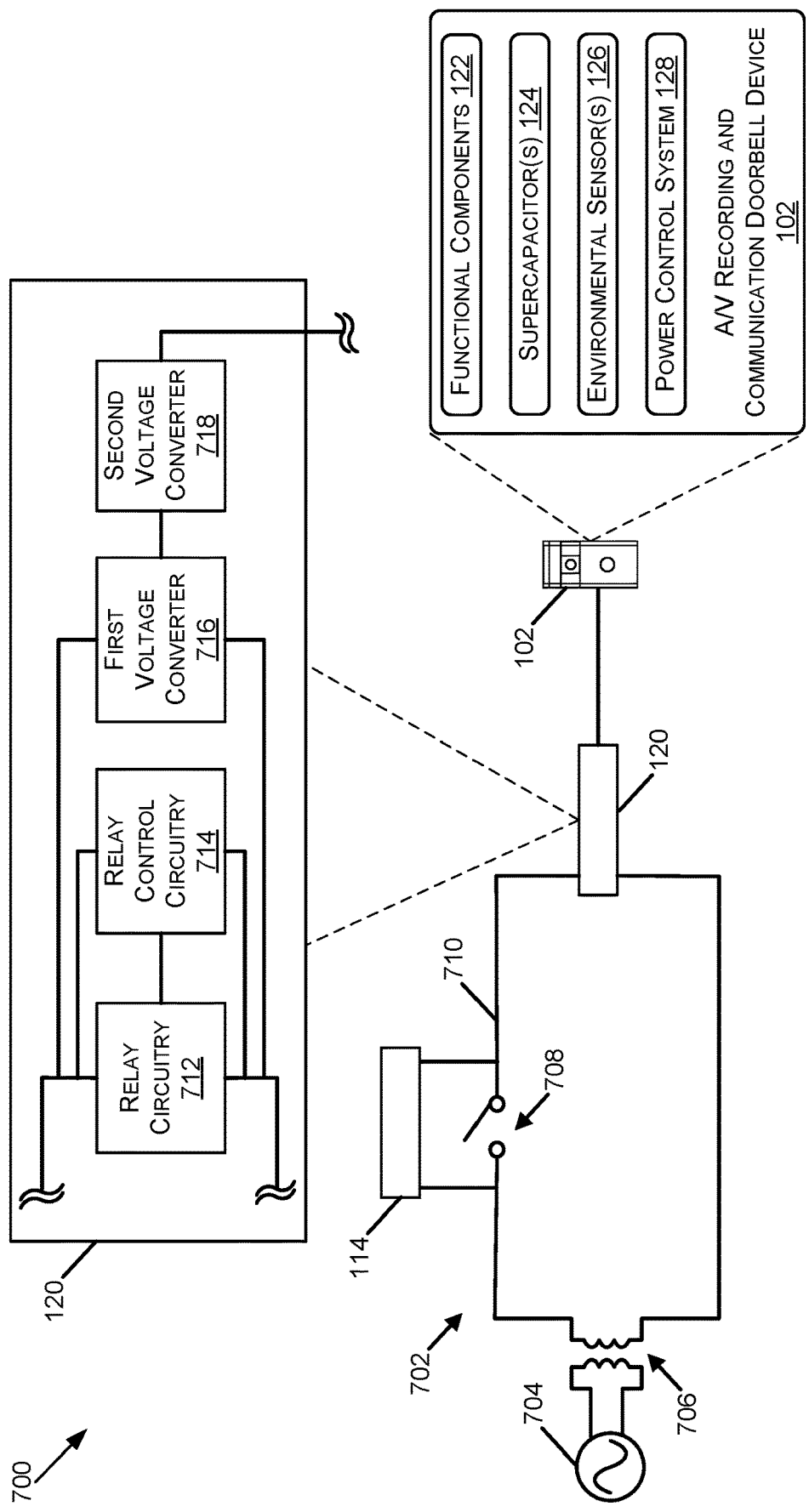
FIG. 7 is a schematic diagram illustrating a system including an A/V doorbell and adaptive circuitry coupled to a signaling device according to various aspects of the present disclosure.

FIG. 7 is a schematic diagram illustrating a system 700 including an A/V doorbell 102 coupled to a signaling device 114. The system 700 may include doorbell power circuitry 702 that is included in a structure, such as the structure 104, to which the A/V doorbell 102 is coupled. The doorbell power circuitry 702 may supply power to the signaling device 114 from a power source 704 to activate the signaling device 114. The doorbell power circuitry 702 may include a transformer 706 that modifies power supplied by the power source 704 for distribution to devices coupled to the doorbell power circuitry 702, such as the A/V recording and communication device 102 and the signaling device 114. The transformer 706 may modify the power supplied by the power source 704 by modifying a voltage of the power source 704. For example, the transformer 706 may modify the voltage of the power source 704 from 120 V AC to values ranging from 4 V AC to 30 V AC. In particular examples, the transformer 706 may modify the voltage of the power source 704 from 120 V AC to 12 V AC. In additional examples, the transformer 706 may modify the voltage from the power source 704 from 120 V AC to 16 V AC. In other examples, the transformer 706 may modify the voltage of the power source 704 from values ranging from 220 V AC to 240 V AC to values ranging from 4 V AC to 30 V AC. To illustrate, the transformer 706 may modify the voltage from the power source 704 from 230 V AC to 12 V AC. In other illustrative examples, the transformer 706 may modify the voltage from the power source 704 from 230 V AC to 16 V AC.

The doorbell power circuitry 702 may also include a switch 708. The switch 708 may include a relay. In illustrative examples, the switch 708 may include a transistor. In particular implementations, the switch 708 may include a metal oxide semiconductor field effect transistor (MOSFET). The switch 708 may be operated to supply power to at least one of the signaling device 114 or the A/V doorbell 102. In various implementations, the switch 708 may provide a path for current to bypass the signaling device 114 and be supplied to the A/V doorbell 102. Additionally, the doorbell power circuitry 702 may include wiring 710 that connects one or more devices to the power source 704 via the transformer 706. In the illustrative example of FIG. 7, the wiring 710 may connect the signaling device 114 and the A/V doorbell 102 to the power source 704. In particular implementations, when the switch 708 is closed, power may be supplied to the A/V doorbell 102 from the transformer 706. In additional implementations, opening the switch 708 may divert power away from the A/V doorbell 102 to the signaling device 114.

The system 700 also includes adaptive circuitry 120 that may control power supplied to the A/V doorbell 102 and the signaling device 114. In particular implementations, the adaptive circuitry 120 may include one or more components to control the supply of power to the A/V doorbell 102. For example, the adaptive circuitry 120 may include relay circuitry 712 and relay control circuitry 714. In certain implementations, the relay circuitry 712 may include a triode for alternating current (TRIAC) 712 and the relay control circuitry 714 may include TRIAC control circuitry. The relay circuitry 712 may control the flow of current between the power source 704 and the A/V doorbell 102. Additionally, the relay control circuitry 714 may regulate current flow through the relay 712 by applying a voltage to a gate of the relay 712. In illustrative implementations, selection of a button on the A/V doorbell 102 may cause the A/V doorbell 102 to send a signal to the relay control circuitry 714 to cause current to flow through the relay 712 to the signaling device 114. The adaptive circuitry 120 may also include a first voltage converter 716 and a second voltage converter 718. In various implementations, the first voltage converter 716 may include an AC/DC converter and the second voltage converter 718 may include buck circuitry to increase the flow of current through the relay component 712 and to the signaling device 114 during activation of the signaling device 114 by the A/V doorbell 102.

During a period of time that current is flowing to the signaling device 114, the one or more supercapacitors 124 may discharge current to supply power to the one or more functional components 122. In particular implementations, the A/V doorbell 102 may determine that a specified amount of time has elapsed after selection of the button of the A/V doorbell 102 and send a signal to the relay control circuitry 714 to cause current to flow to the A/V doorbell 102. In this way, power may be restored to the A/V doorbell 102 from the power source 704 and power may be supplied to the functional components 122 from the power source 704 and the one or more supercapacitors 124 may be recharged.

Figure 8:
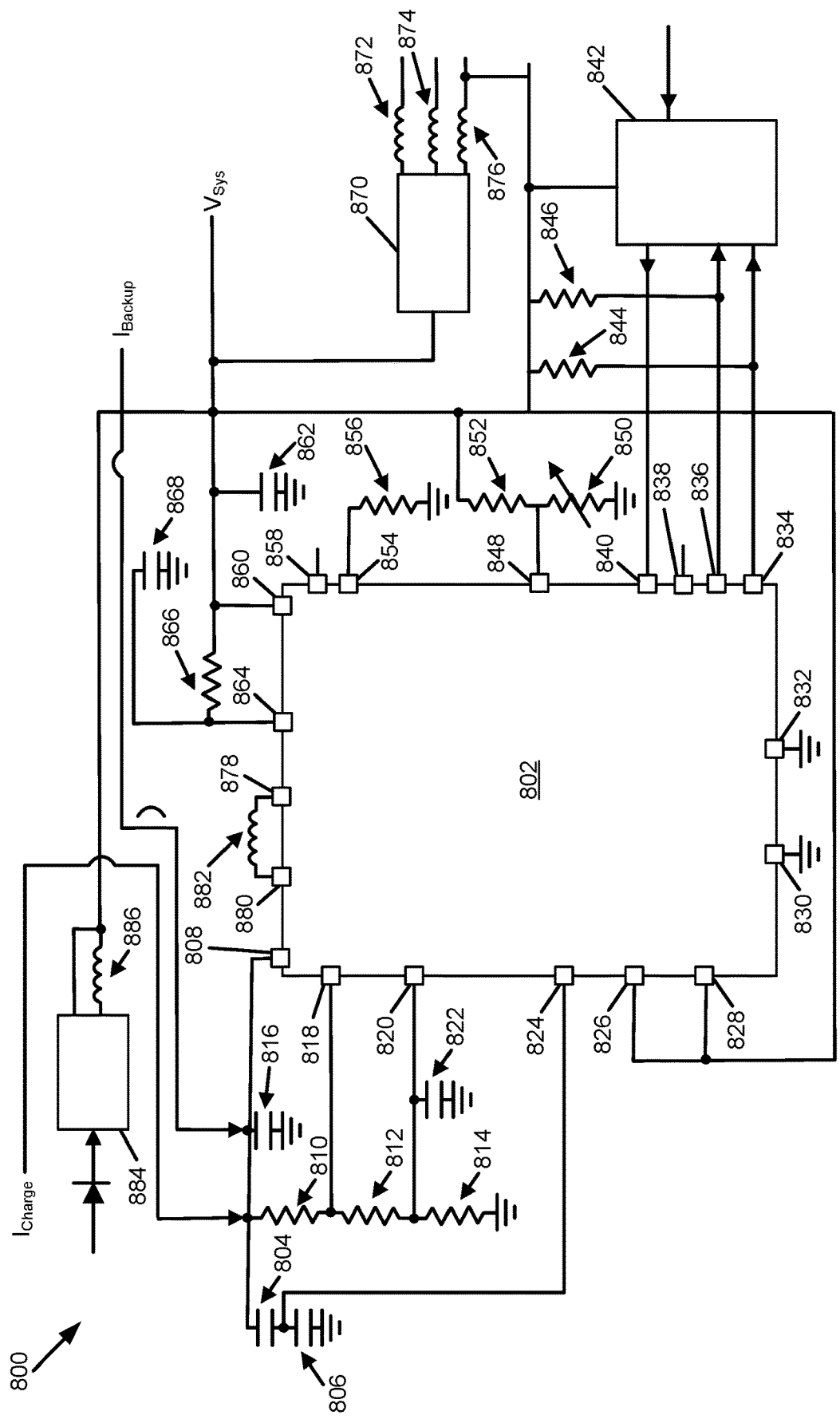
FIG. 8 is a schematic diagram illustrating circuitry to control the charging and discharging of a group of supercapacitors according to various aspects of the present disclosure.

FIG. 8 is a schematic diagram illustrating circuitry 800 to control the charging and discharging of a group of supercapacitors. In particular implementations, at least a portion of the circuitry 800 may comprise the supercapacitor control circuitry 130. The circuitry 800 includes a controller 802 and a first supercapacitor 804 and a second supercapacitor 806. The controller 802 may control the charging and discharging of the supercapacitors 804, 806. The controller 802 may include a first pin 808 that is coupled to the supercapacitors 804, 806, to a group of resistors 810, 812, 814, and to a capacitor 816. The group of resistors 810, 812, 814 may function as a voltage divider. In addition, the controller 802 may include a second pin 818 that is coupled to the group of resistors 810, 812, 814. In a charge mode, current may flow out of the second pin 818 to charge one or more storage elements including the first supercapacitor 804 and the second supercapacitor 806. In a backup mode, current may flow into the second pin 818 and the stored energy may be used to backup one or more loads coupled to the controller. Further, the controller 802 may include a third pin 820 that is also coupled to the group of resistors 810, 812, 814 and to a capacitor 822. A voltage at the third pin 820 may be compared to an internal reference voltage of the controller 802.

The controller 802 may include a fourth pin 824 coupled to the first supercapacitor 804 and the second supercapacitor 806. Additionally, the controller 802 may include a fifth pin 826 that may be driven to a first state that programs fixed frequency, low noise pulse width modulation (PWM) operation of the supercapacitors 804, 806 and may be driven to a second state that programs burst mode operation of the supercapacitors 804, 806. The controller 802 may also include a sixth pin 828 that may operate normally at a voltage above a first threshold voltage and may cause a shutdown of the circuitry 800 at a voltage that is below a second threshold. Further, the controller 802 may include a seventh pin 830 to which sensitive analog components terminated at ground are coupled and an eighth pin 832 where all high current ground paths terminate.

The controller 802 may include a ninth pin 834 that may be an output for one or more comparators of the controller 802. The output of the ninth pin 834 may be pulled low when the voltage at the ninth pin 834 is above a comparator voltage and output at the ninth pin 834 may be released when the voltage at the ninth pin 834 is below a specified threshold voltage. In addition, the controller 802 may include a tenth pin 836 having a voltage that is pulled low if the voltage at the second pin 818 is lower than a first threshold voltage and the output of the tenth pin 836 may be released when the voltage at the second pin 818 is higher than a second threshold voltage. Further, the controller 802 may include an eleventh pin 838 that is pulled low when a regulator of the controller 802 is in a charge mode and an open drain output of the eleventh pin 838 is released when the regulator is in a backup mode.

The controller 802 may also include a twelfth pin 840 where a voltage above a threshold voltage enables a charging mode of the controller 802 and a voltage on the twelfth pin 840 below the threshold voltage enables a backup mode of the controller 802. In some implementations, the twelfth pin 840 may be coupled to a voltage divider. In the illustrative implementations of FIG. 8, the ninth pin 834, the tenth pin 836, and the twelfth pin 840 may be coupled to a microcontroller 842. The microcontroller 842 may be coupled to a bus supervisor that monitors voltage to one or more functional components of an A/V doorbell. The microcontroller 842 may determine when to stop the discharge of current from the supercapacitors 804, 806 in response to the respective charges of the respective supercapacitors 804, 806 being less than a threshold and determine when to stop charging the supercapacitors 804, 806 based on a charging voltage of the supercapacitors 804, 806 meeting or exceeding an additional threshold. A fourth resistor 844 and a fifth resistor 846 may be coupled to the microcontroller 842.

In addition, the controller 802 may include a thirteenth pin 848 that may be a backup voltage feedback pin. The thirteenth pin 848 may adjust a voltage at a bidirectional power supply pin of the controller 802. In particular implementations, the thirteenth pin 848 may be used to adjust a voltage at the bidirectional power supply pin from a voltage of about 1.8 V to about 5.25 V with a feedback reference voltage of about 0.6 V. The thirteenth pin 848 may be coupled to a sixth resistor 850 and a seventh resistor 852. The sixth resistor 850 may be a variable resistor that may be used to maintain a voltage along a rail coupled to one or more functional components of an A/V doorbell, such as the A/V doorbell 102 of FIG. 1.

In various implementations, the amount of impedance associated with the sixth resistor 850 may be adjusted to maintain a substantially consistent voltage along the rail coupled to the one or more functional components of the A/V doorbell 102. In illustrative implementations, the supercapacitors 804, 806 may begin discharging current at a first time. During a first period of time that includes the first time and a subsequent second time, the amount of current discharged from the supercapacitors 804, 806 may correspond to a voltage along the rail coupled to the one or more functional components of the A/V doorbell 102 that is above a threshold voltage. In these situations, the impedance of the sixth resistor 850 may be increased such that the voltage along the rail coupled to the one or more functional components of the A/V doorbell 102 may be maintained at values that are substantially similar to the threshold voltage. Further, during a second period of time that is subsequent to the first period of time, the amount of current discharged from the supercapacitors 804, 806 may correspond to a voltage along the rail coupled to the one or more functional components of the A/V doorbell 102 that is less than the threshold voltage. The second period of time may begin at a third time that occurs after the second time and the second period of time may last to a fourth time subsequent to the third time. In particular implementations, the third time may be immediately following the second time, such as within less than one second, within less than 100 milliseconds, or within less than 1 millisecond of the second time.

During the second period of time, the sixth resistor 850 may be adjusted to a lower impedance to increase the voltage along the rail coupled to the one or more functional components of the A/V doorbell 102. In certain implementations, boost circuitry may be activated in conjunction with the sixth resistor 850 to maintain a voltage along the rail coupled to the one or more functional components of the A/V doorbell 102 at values that are substantially similar to the threshold voltage. As the amount of current discharged from the supercapacitors 804, 806 decreases, the impedance of the sixth resistor 850 may also decrease in a way that the voltage supplied to the one or more functional components of the A/V doorbell 102 is maintained at a substantially consistent voltage. Although the illustrative implementations of FIG. 8 may control the voltage supplied to one or more functional components of the A/V doorbell 102 based on the current discharged from the supercapacitors 804, 806 using the sixth resistor 850, in other implementations, the control of the current discharged from the supercapacitors 804, 806 may be performed by other means, such as by a microprocessor or microcontroller.

The controller 802 may also include a fourteenth pin 854 that is coupled to an eighth resistor 856. The eighth resistor 856 may control an average current flowing in a bidirectional power supply pin when the controller 802 is operating in a charging mode. Further, the controller 802 may include a fifteenth pin 858 that is coupled to an internal sense resistor of the controller 802. The fifteenth pin 858 is internally shorted to a sixteenth pin 860. The sixteenth pin 860 may include a bidirectional power supply pin for a system backup output voltage and for a charge current input voltage. The sixteenth pin 860 may be coupled to a first capacitor 862 that is connected between the sixteenth pin 860 and the eighth pin 832. Additionally, the controller 802 may include a seventeenth pin 864 that may be a signal supply voltage input for buck/boost controller circuitry. The seventeenth pin 864 may be shorted to the sixteenth pin 860 or supplied from the fourteenth pin through an RC filter. The seventeenth pin 864 may be coupled to a ninth resistor 866 and a second capacitor 868. In various implementations, the fifteenth pin 858 and the sixteenth pin 860 may be coupled to one or more regulators 870. The one or more regulators 870 may be coupled to a first inductor 872, a second inductor 874, and a third inductor 876. In particular implementations, the one or more regulators 870 may be DC to DC regulators that maintain a voltage, such as $V_{sys}$, within a specified range of values.

In addition, the controller 802 may include an eighteenth pin 878 and a nineteenth pin 880. The eighteenth pin 878 and the nineteenth pin 880 may be coupled to buck-boost circuitry of the controller 802. A fourth inductor 882 may also be coupled between the eighteenth pin 878 and the nineteenth pin 880. The system 800 may also include a step-down converter 884 that is coupled to a fifth inductor 886. The step-down converter 884 may include DC/DC buck circuitry to reduce a voltage from a voltage bus coupled to the system 800 such that the voltage may be used by other components of the system 800. Further, a first current, $I_{Charge}$, and a second current $I_{Backup}$, may be supplied to the system 800 in relation to a charge mode of the controller 802 and a backup mode of the controller 802.

Figure 9:
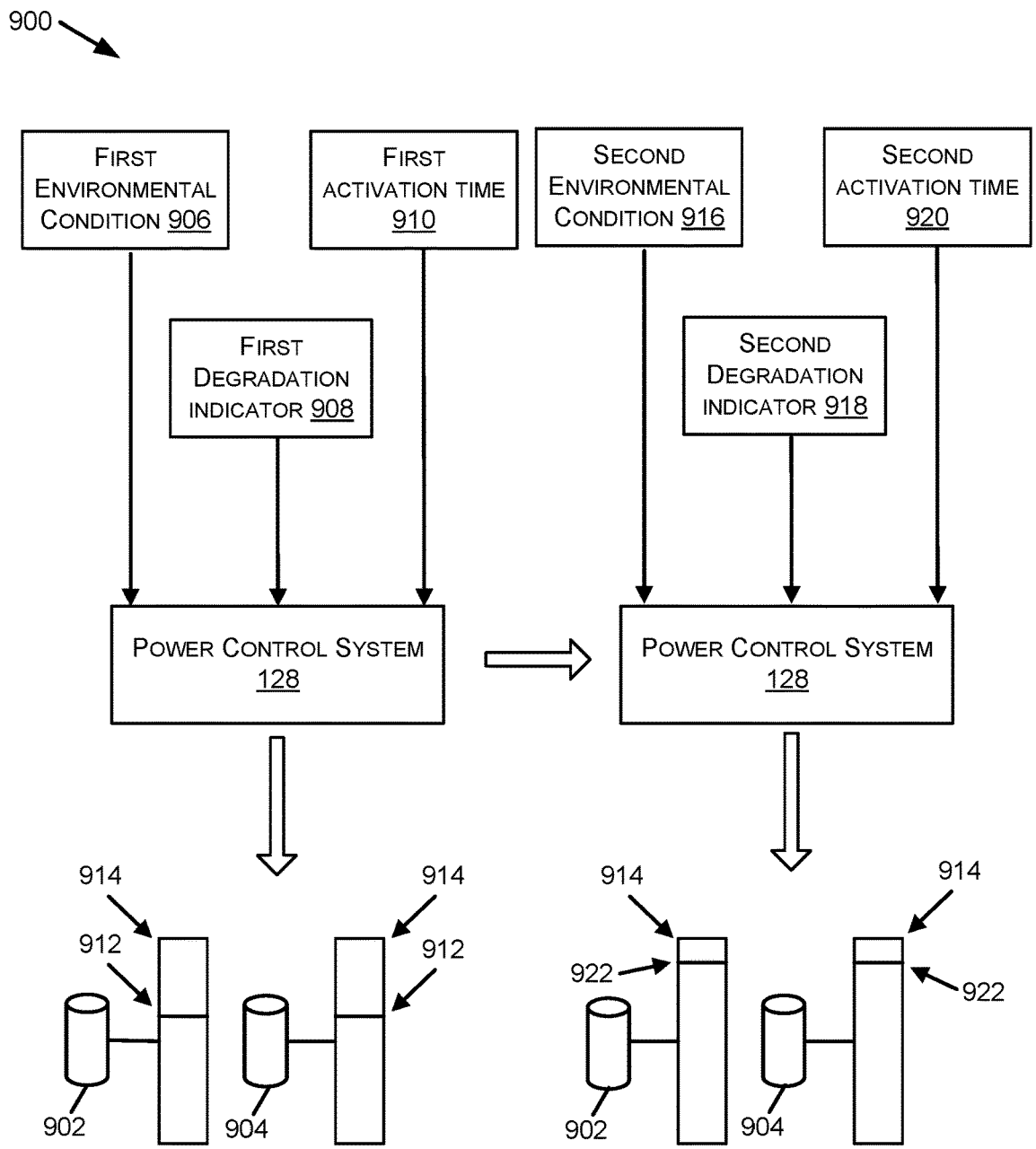
FIG. 9 is a schematic diagram illustrating a framework to determine a voltage to apply to charge a group of supercapacitors according to various aspects of the present disclosure.

FIG. 9 illustrates a framework 900 to determine a voltage to charge a group of supercapacitors based on one or more factors. The framework 900 may include the power control system 128 and one or more inputs to the power control system 128. The inputs to the power control system 128 may determine a voltage to which the group of supercapacitors are charged. In certain implementations, the voltage to which the group of supercapacitors is charged may be referred to as an operating voltage. The voltage to which the group of supercapacitors is charged may also correspond to a voltage applied to charge the group of supercapacitors. The group of supercapacitors may include a first supercapacitor 902 and a second supercapacitor 904. In particular implementations, an operating voltage of the first supercapacitor 902 and the second supercapacitor 904 may be from 1 V to 5 V. In additional implementations, an operating voltage of the first supercapacitor 902 and the second supercapacitor 904 may be from 1.5 V to 4.5V. In further implementations, an operating voltage of the first supercapacitor 902 and the second supercapacitor 904 may be from 2 V to 4 V. In still other implementations, an operating voltage of the first supercapacitor 902 and the second supercapacitor 904 may be from 2.2 V to 2.8 V.

In various implementations, the power control system 128 may obtain one or more environmental conditions from one or more sensors of the A/V doorbell 102. In the illustrative example of FIG. 9, the power control system 128 may receive a first environmental condition 906. The first environmental condition 906 may be obtained from an environmental sensor of the A/V doorbell 102. For example, the first environmental condition 906 may include a first temperature that is obtained from a temperature sensor of the A/V doorbell 102. In another example, the first environmental condition 906 may include a first relative humidity that is obtained from a relative humidity sensor of the A/V doorbell 102. In an additional example, the first environmental condition 906 may include a first barometric pressure that is obtained from a barometric pressure sensor of the A/V doorbell 102.

The power control system 128 may also obtain a first degradation indicator 908 that indicates an amount of degradation of the group of supercapacitors. The amount of degradation of the group of supercapacitors may be related to a maximum voltage to which the group of supercapacitors may be charged. The amount of degradation of the group of supercapacitors may also be related to an amount of time that the group of supercapacitors can maintain a voltage above a threshold voltage. In particular implementations, the first degradation indicator 908 may include a number of charge cycles and/or a number of discharge cycles of the group of supercapacitors. The first degradation indicator 908 may correspond to an individual supercapacitor of the group of supercapacitors, such as the first supercapacitor 902, or correspond to an overall amount of degradation for the group of supercapacitors. The power control system 128 may obtain the first degradation indicator 908 by monitoring a number of times that the group of supercapacitors are charged and/or discharged. In additional implementations, the power control system 128 may obtain the first degradation indicator 406 by monitoring a voltage of the individual supercapacitors of the group of supercapacitors over a period of time and determining a rate that the voltage decreases over time between discharge events where the supercapacitor is actively discharged. In certain situations, the decrease in voltage of the supercapacitors over time may be related to a leakage current of the individual supercapacitors of the group of supercapacitors. Degradation indicators of a group of supercapacitors may also be related to a capacitance of the group of supercapacitors and/or leakage current of the group of supercapacitors. In illustrative examples, the capacitance of a group of supercapacitors may decrease when the group of supercapacitors are exposed to relative humidity levels that are at least 40% for a specified period of time and/or temperatures of at least 60° C. for a specified period of time. Leakage current of a group of supercapacitors may increase when the group of supercapacitors are exposed to temperatures greater than 45° C. for a period of time.

The power control system 128 may also obtain a first activation time 910 that indicates an amount of time that the signaling device 114 produces sound upon activation. In particular implementations, the first activation time 910 may be obtained via a mobile device application of an occupant of the structure 102. For example, a mobile device application may display a user interface that includes at least one user interface element to capture data indicating an amount of time that the signaling device 114 produces sound when activated. The amount of time input into the user interface element may correspond to the first activation time 910. In additional implementations, the first activation time 910 may be selected from a list of activation times for the signaling device 114 and made available to the power control system 128.

The power control system 128 may determine a first voltage 912 to charge the first supercapacitor 902 and the second supercapacitor 904. In the illustrative example of FIG. 9, the first supercapacitor 902 and the second supercapacitor 904 may be charged to a maximum voltage 914, and the first voltage 912 is less than the maximum voltage 914. The maximum voltage 914 may be from 4 V to 6 V, in certain implementations. In additional implementations, the maximum voltage 914 may be from 4.5 V to 5.5V. Further, the first supercapacitor 902 and the second supercapacitor 904 may have a capacitance from 1 farad (F) to 100 F, from 5 F to 50 F, from 7.5 F to 40 F, or from 10 F to 30 F.

The first voltage 912 may be based at least partly on the first environmental condition 906, the first degradation indicator 908, the first activation time 910, or combinations thereof. In various implementations, the power control system 128 may identify a particular factor or a particular combination of factors that may be used to determine a voltage to charge the first supercapacitor 902 and the second supercapacitor 904. In particular implementations, weightings may be assigned to the first environmental condition 906, the first degradation indicator 908, and/or the first activation time 910 to determine the first voltage 912. The power control system 128 may determine values for each of the factors 906, 908, 910, normalize the values, and apply the weightings to determine a voltage to charge the first supercapacitor 902 and the second supercapacitor 904, such as the first voltage 912. In various implementations, the weightings may change over time. For example, as the number of charge and/or discharge cycles of the first supercapacitor 902 and the second supercapacitor 904 increase, degradation indicators may be weighted more heavily than environmental conditions or activation times.

Over time, the voltage to which the first supercapacitor 902 and the second supercapacitor 904 are to be charged may change. For example, as environmental conditions change, the voltage to which the first supercapacitor 902 and the second supercapacitor 904 are charged may be modified. To illustrate, as a temperature outside of the structure 102 increases, the voltage to which the first supercapacitor 902 and the second supercapacitor 904 are charged may decrease and as a temperature outside of the structure 102 decreases, the voltage to which the first supercapacitor 902 and the second supercapacitor 904 are charged may increase. In additional implementations, as the amount of degradation of the first supercapacitor 902 and the second supercapacitor 904 changes, the voltage to which the first supercapacitor 902 and the second supercapacitor 904 are charged may change. In illustrative examples, as the degradation of the first supercapacitor 902 and the second supercapacitor 904 increases, the voltage to which the first supercapacitor 902 and the second supercapacitor 904 are charged may increase. Further, as activation times for the signaling device 114 change, the voltage to which the first supercapacitor 902 and the second supercapacitor 904 are charged may also be modified. In particular examples, longer activation times may correspond to higher voltages such that sufficient current is discharged from the supercapacitors to activate the signaling device 114 for a specified activation time.

In particular implementations, the voltage applied to charge the first supercapacitor 902 and the second supercapacitor 904 under one or more first environmental conditions 906 may be at least 5%, at least 10%, at least 15%, at least 20%, or at least 25% different than the voltage applied to charge the first supercapacitor 902 and the second supercapacitor 904 under one or more second environmental conditions 916. In additional implementations, the voltage applied to charge the first supercapacitor 902 and the second supercapacitor 904 under one or more first environmental conditions 906 may be no greater than 50%, no greater than 45%, no greater than 40%, no greater than 35%, or no greater than 30% different than the voltage applied to charge the first supercapacitor 902 and the second supercapacitor 904 under one or more second environmental conditions 916. In further implementations, the voltage applied to charge the first supercapacitor 902 and the second supercapacitor 904 under one or more first environmental conditions 906 may be from 5% to 50%, from 10% to 40%, from 10% to 30%, or from 15% to 25% different than the voltage applied to charge the first supercapacitor 902 and the second supercapacitor 904 under one or more second environmental conditions 916.

In illustrative examples, for every 8° C. to 12° C. that the temperature to which the first supercapacitor 902 and the second supercapacitor 904 are exposed increases, the voltage applied to charge the first supercapacitor 902 and the second supercapacitor 904 may decrease by an amount from 7% to 15%. In certain illustrative examples, the voltage applied to charge the first supercapacitor 902 and the second supercapacitor 904 may correspond to a specified mean time to failure (MTTF). Thus, as the temperature to which the first supercapacitor 902 and the second supercapacitor 904 are exposed increases, the voltage applied to charge the first supercapacitor 902 and the second supercapacitor 904 may decrease to keep the MTTF at a certain number of years or within a range of years. In particular implementations, the MTTF that corresponds to the first supercapacitor 902 and the second supercapacitor 904 may be from 1 year to 100 years, from 5 years to 50 years, or from 10 years to 30 years. In various examples, the MTTF of the first supercapacitor 902 and the second supercapacitor 904 may be 50 years and a change in the temperature to which the first supercapacitor 902 and the second supercapacitor 904 are exposed may increase from 30° C. to 40° C. In these situations, the voltage applied to charge the first supercapacitor 902 and the second supercapacitor 904 may be 20% less at 40° C. than the voltage applied to charge the first supercapacitor 902 and the second supercapacitor at 30° C. In additional implementations, the MTTF may not be affected below a threshold temperature to which the first supercapacitor 902 and the second supercapacitor 904 are exposed. To illustrate, for a MTTF of 50 years, the voltage applied to charge the first supercapacitor 902 and the second supercapacitor 904 may remain unchanged when the temperatures to which the first supercapacitor 902 and the second supercapacitor 904 are exposed is no greater than 30° C. In another example, for a MTTF of 10 years, the voltage applied to charge the first supercapacitor 902 and the second supercapacitor 904 may remain unchanged when the temperatures to which the first supercapacitor 902 and the second supercapacitor 904 are exposed is no greater than 50° C.

In various implementations, the temperature to which the first supercapacitor 902 and the second supercapacitor 904 are exposed may include a temperature external to the A/V doorbell 102 plus an internal temperature increase. The internal temperature increase may be related to an amount of heat generated by the operation of one or more components of the A/V doorbell 102. In illustrative examples, the internal temperature increase may be from 2° C. to 30° C., from 5° C. to 25° C., or from 10° C. to 20° C.

In the illustrative example of FIG. 9, the power control system 128 may obtain a second environmental condition 916, a second degradation inhibitor 918, and a second activation time 920. In particular implementations, the first environmental condition 906 may be different from the second environmental condition 916, the first degradation indicator 908 may be different from the second degradation indicator 918, and/or the first activation time 910 may be different from the second activation time 920. The power control system 128 may determine a second voltage 922 to which the first supercapacitor 902 and the second supercapacitor 904 are to be charged based at least partly on at least one of the second environmental condition 916, the second degradation inhibitor 918, or the second activation time 920.

In certain implementations, the activation time of the signaling device 114 may be modified based on at least one of the environmental conditions or the degradation indicators. In various implementations, the power control system 128 may determine that an activation time for the signaling device 114 may be decreased based on determining that the voltage to which the first supercapacitor 902 and the second supercapacitor 904 is above a threshold voltage. The threshold voltage may include the maximum voltage 914, a voltage that is a specified tolerance (e.g., 10% of the maximum voltage 914) above the maximum voltage 914, or a voltage that is a specified tolerance below the maximum voltage 914. In an illustrative example, the power control system 128 may determine based on an environmental condition and/or degradation indicators of the supercapacitors 902, 904 that an operating voltage for the first supercapacitor 902 and the second supercapacitor 904 in order to activate the signaling device 114 for a specified activation time is greater than the maximum voltage 914. Continuing with this example, the power control system 128 may determine that the activation time of the signaling device 114 is to be decreased in order to bring the operating voltage of the supercapacitors 902, 904 below the maximum voltage 914. In these situations, the power control system 128 may cause current to be provided to the signaling device 114 from the supercapacitors 902, 904 for a period of time that is less than the specified activation time of the signaling device 114.

Each of the processes described herein, including the processes 1000 and 1100, are illustrated as a collection of blocks in a logical flow graph, which represent a sequence of operations that may be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks may be combined in any order and/or in parallel to implement the processes. Additionally, any number of the described blocks may be optional and eliminated to implement the processes.

Figure 10:
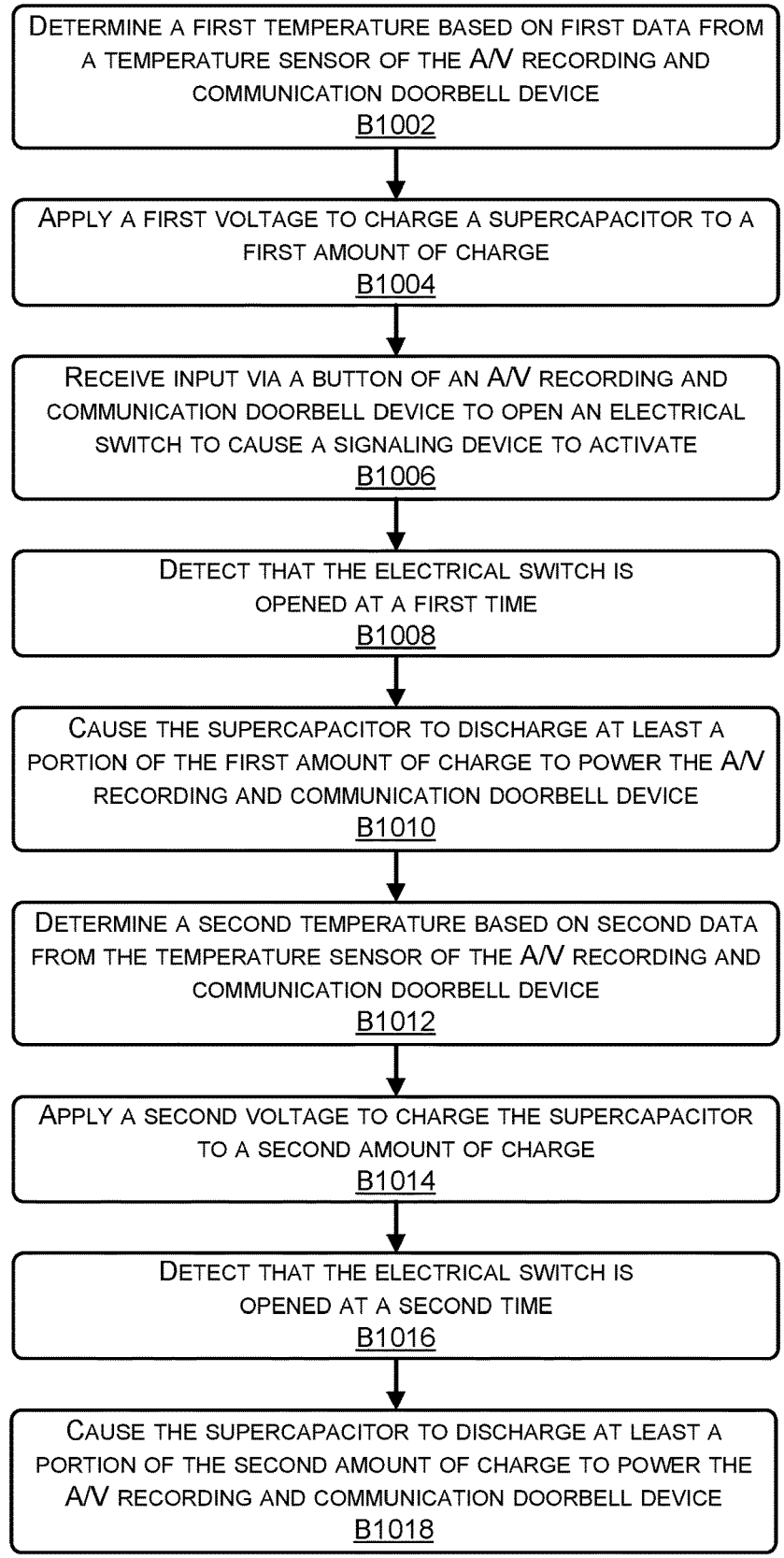
FIG. 10 is a flowchart illustrating an example process for powering an A/V doorbell using one or more supercapacitors according to various aspects of the present disclosure.

FIG. 10 is a flowchart illustrating a first example process 1000 for powering an A/V doorbell using one or more supercapacitors according to various aspects of the present disclosure. The process 1000, at block B1002, includes determining a first temperature based on first data from a temperature sensor of the A/V doorbell 102, 210. The temperature may correspond to an ambient temperature around the A/V doorbell 102, 210 and external to the structure 104.

The process 1000, at block B1004, includes applying a first voltage to charge a supercapacitor 124, 342 to a first amount of charge. In various embodiments, the amount of charge on the supercapacitor 124, 342 may be measured in volts, and may correspond to the voltage applied to the supercapacitor 124, 342 in order to charge the supercapacitor 124, 342. The supercapacitor 124, 342 may be one of a plurality of supercapacitors of the A/V doorbell 102, 210. The supercapacitor 124, 342 may be configured to supply power to the A/V doorbell 102, 210 when power supplied by the doorbell power circuitry 702 to the A/V doorbell 102, 210 is diverted to the signaling device 114. The voltage applied to charge the supercapacitor 124, 342 may be based at least partly on the temperature. The A/V doorbell 102, 210 may determine the charge of the supercapacitor 124, 342 according to one or more factors, including temperature, in a way that increases the lifetime of the supercapacitor 124, 342.

The process 1000, at block B1006, includes receiving input via a button of an A/V doorbell to open an electrical switch to cause a signaling device to activate. The electrical switch 708 may be part of doorbell power circuitry 702 of a structure 104 to which the A/V doorbell 102, 210 is attached. The switch 708 may be used to divert power away from the A/V doorbell 102, 210 to a signaling device 114 in response to selection of the button 306. The button 306 may be a physical button disposed on the A/V doorbell 102, 210 and/or a button displayed on a user interface of the A/V doorbell 102, 210.

The process 1000, at block B1008, includes detecting that the electrical switch 708 is opened at a first time. In particular implementations, opening of the first electrical switch 708 may be detected by the A/V doorbell 102, 210 monitoring a voltage available to supply power to the A/V doorbell 102, 210. For example, the A/V doorbell 102, 210 may monitor a voltage along wiring coupling the A/V doorbell 102, 210 to a power source 704 of the structure 104. In additional implementations, the A/V doorbell 102, 210 may detect that the electrical switch 708 is opened by monitoring a current flowing to the A/V doorbell 102, 210 from the doorbell power circuitry 702. The A/V doorbell 102, 210 may detect that the electrical switch 708 has been opened based at least partly on the voltage available to supply power to the A/V doorbell 102, 210 is less than a threshold voltage. Further, the A/V doorbell 102, 210 may detect that the electrical switch 708 has been opened based at least partly on current supplied by the doorbell power circuitry 702 to the A/V doorbell 102, 210 being less than a threshold current. The A/V doorbell 102, 210 may also detect that the electrical switch 708 is opened at a first time based on a power control system 128 of the A/V doorbell 102, 210 sending a signal to the electrical switch 708 to open in order to divert power from the A/V doorbell 102, 210 to the signaling device 114.

The process 1000, at block B1010, includes causing the supercapacitor 124, 342 to discharge at least a portion of the first amount of charge to power the A/V doorbell 102, 210. For example, a power control system 128 of the A/V doorbell 102, 210 may cause a voltage to be applied to the supercapacitor 124, 342 to discharge current that is supplied to one or more functional components 122 of the A/V doorbell 102, 210. The voltage applied to cause the supercapacitor 124, 342 to discharge may correspond to the voltage applied to charge the supercapacitor 124, 342.

Additionally, the amount of charge discharged by the supercapacitor 124, 342 may correspond to the value of the voltage applied to cause the supercapacitor 124, 342 to discharge. The one or more functional components 122 of the A/V doorbell 102, 210 may include at least one of a camera, a lighting device, a display device, a network interface, memory, a processor, a microphone, or a speaker. The amount of current supplied to the one or more functional components 122 of the A/V doorbell 102, 210 may be sufficient to power the one or more functional components 122 for a duration that is at least a duration that corresponds to an amount of time that the signaling device 114 is to be activated in response to the selection of the button 306.

The process 1000, at block B1012, includes determining a second temperature based on second data from the temperature sensor of the A/V doorbell 102, 210. The second temperature may be different from the first temperature. In some examples, the second temperature may be higher than the first temperature. In other examples, the second temperature may be less than the first temperature.

The process 1000, at block B1014, includes applying a second voltage to charge the supercapacitor 124, 342 to a second amount of charge. The second amount of charge may be different from the first amount of charge. In some examples, the second amount of charge may be greater than the first amount of charge. In other examples, the second amount of charge may be less than the first amount of charge. In particular implementations, the second temperature may be greater than a first threshold temperature and the second voltage may be less than the first voltage. In additional implementations, the second temperature may be less than a second threshold temperature and the second voltage may be greater than the first voltage. The first threshold temperature may be greater than the second threshold temperature. In various implementations, the first threshold temperature may represent a temperature at which the lifetime of the supercapacitor 124, 342 may degrade when the voltage of the supercapacitor 124, 342 is maintained at the first voltage. Further, the second threshold temperature may represent a temperature at which the first voltage would not provide sufficient power for the A/V doorbell 102, 210 when power is diverted to the signaling device 114. In some examples, the first threshold temperature may be a temperature included in the range of 35° C. to 50° C. and the second threshold temperature may be a temperature included in a range of −10° C. to 5° C.

The process 1000, at block B1016, includes detecting that the electrical switch 708 is opened at a second time and, the process 1000, at block B1018, may cause the supercapacitor 124, 342 to discharge at least a portion of the second amount of charge to power the A/V doorbell 102, 210. The second time that the electrical switch 708 is opened may be detected using techniques similar to the techniques used to detect the first time that the electrical switch 708 was opened. Additionally, the second amount of charge may be discharged from the supercapacitor 124, 342 by a voltage being applied to the supercapacitor 124, 342 that is in proportion to the amount of charge discharged by the supercapacitor 124, 342.

Figure 11:
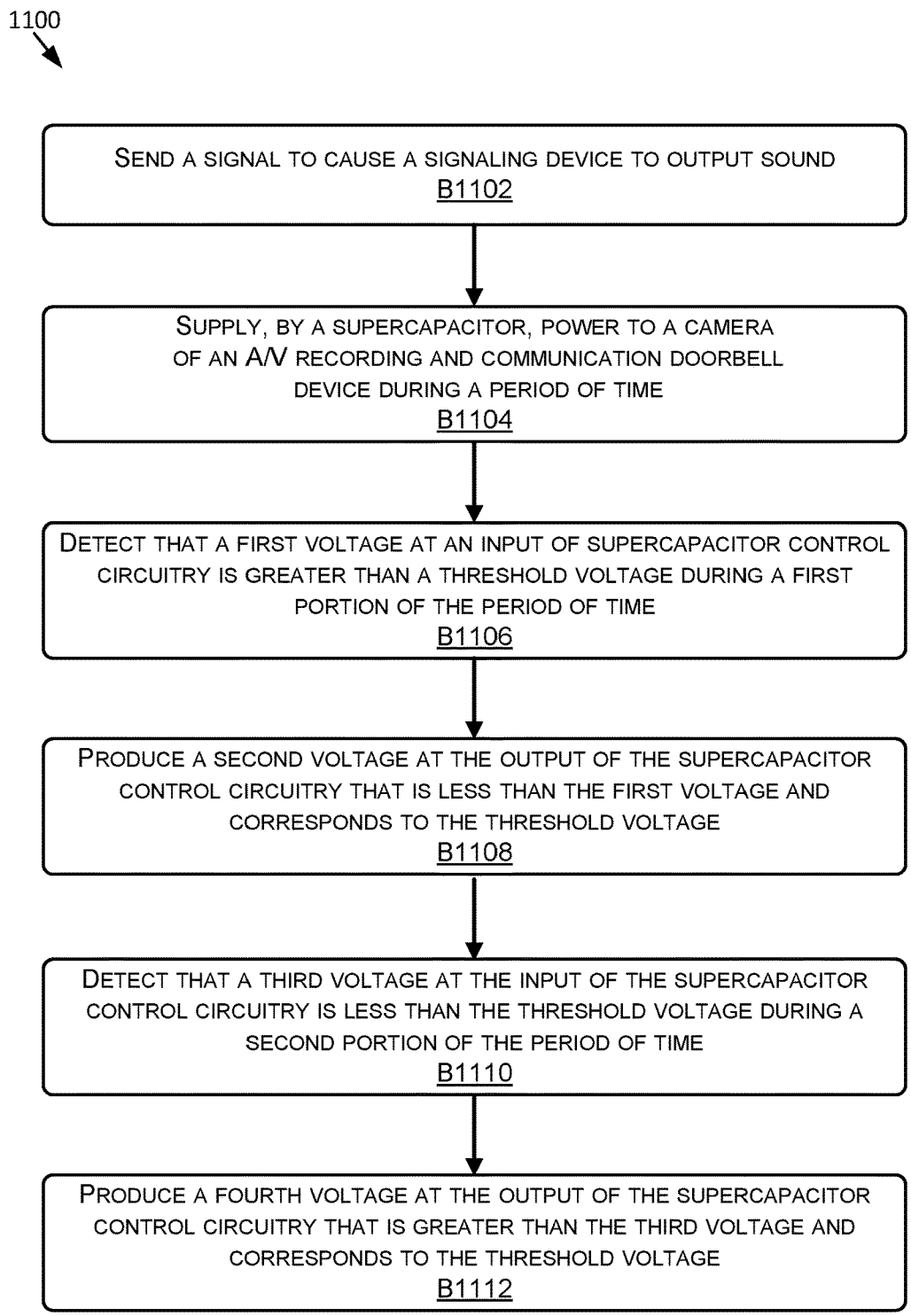
FIG. 11 is a flowchart illustrating an example process for determining a voltage to charge one or more supercapacitors that may power an A/V doorbell according to various aspects of the present disclosure.

FIG. 11 is a flowchart illustrating a second example process 1100 for determining a voltage to charge one or more supercapacitors that may power an A/V doorbell according to various aspects of the present disclosure. The process 1100, at block B1102, includes sending a signal to cause a signaling device 114 to output sound. The signal may be sent by an A/V doorbell 102, 210 in response to selection of a button 306 of the A/V doorbell 102, 210. The signal may cause a switch 708 included in doorbell power circuitry coupled 702 to the signaling device 114 and the A/V doorbell 102, 210 to open and divert power to the signaling device 114 and away from the A/V doorbell 102, 210.

The process 1100, at block B1104, includes supplying, by a supercapacitor 124, 342, power to a camera of the A/V doorbell 102, 210 during a period of time. Thus, the supercapacitor 124, 342 may supply power to functional components 122 of the A/V doorbell 102, 210, such as the camera, when power is being diverted to the signaling device 114 and away from the A/V doorbell 102, 210. In this way, the functional components 122 of the A/V doorbell 102, 210 may continue to operate when not receiving power from the doorbell power circuitry 702. In various implementations, the period of time may correspond to an amount of time in which the supercapacitor 124, 342 supplies a particular amount of current for components of the A/V doorbell 102, 210. For example, the supercapacitor 124, 342 may discharge current in a non-linear manner. To illustrate, the supercapacitor 124, 342 may discharge current along an exponential curve. The period of time may correspond to at least a portion of the curve indicating the amount of current being discharged from the supercapacitor 124, 342.

The process 1100, at block B1106, includes detecting that a first voltage at an input of supercapacitor control circuitry 130 is greater than a threshold voltage during a first portion of the period of time, and the process 1100, at block B1108, includes producing a second voltage at the output of the supercapacitor control circuitry 130 that is less than the first voltage and corresponds to the threshold voltage. In various implementations, the supercapacitor control circuitry 130 may control the power that is supplied to functional components 122 of the A/V doorbell 102, 210. For example, the supercapacitor control circuitry 130 may maintain a voltage that corresponds to a threshold voltage along a rail that supplies power to functional components 122 of the A/V doorbell 102, 210. Thus, since the supercapacitor 124, 342 may discharge current according to an exponential function, the voltage available based on the current discharged by the supercapacitor 124, 342 during a first period of time may be greater than the threshold voltage. In these situations, the supercapacitor control circuitry 130 may include buck circuitry to decrease the voltage along the power supply rail to maintain the voltage available to the functional components 122 at the threshold voltage.

The process 1100, at block B1110, includes detecting that a third voltage at the input of the supercapacitor control circuitry 130 is less than the threshold voltage during a second portion of the period of time, and the process 1100, at block 1112 includes producing a fourth voltage at the output of the supercapacitor control circuitry 130 that is greater than the third voltage and corresponds to the threshold voltage. In particular implementations, after a certain amount of time, the supercapacitor 124, 342 may discharge an amount of current such that the voltage available to the functional components 122 of the A/V doorbell 102, 210 is less than a threshold voltage. That is, as the amount of current discharged by the supercapacitor 124, 342 moves down the exponential curve, the current supplied by supercapacitor 124, 342 may be unable to maintain the voltage along the power supply rail. In these scenarios, the supercapacitor control circuitry 130 may include boost circuitry to increase the voltage available to supply power to the functional components 122 of the A/V doorbell 102, 210, such that the voltage along the power supply rail is substantially consistent. In various examples, maintaining a substantially consistent voltage along the power supply rail may include producing a voltage along the power supply rail that is within a predetermined tolerance of the threshold voltage, such as within 1% of the threshold voltage, within 3% of the threshold voltage, within 5% of the threshold voltage, within 7% of the threshold voltage, or within 10% of the threshold voltage.

Figure 12:
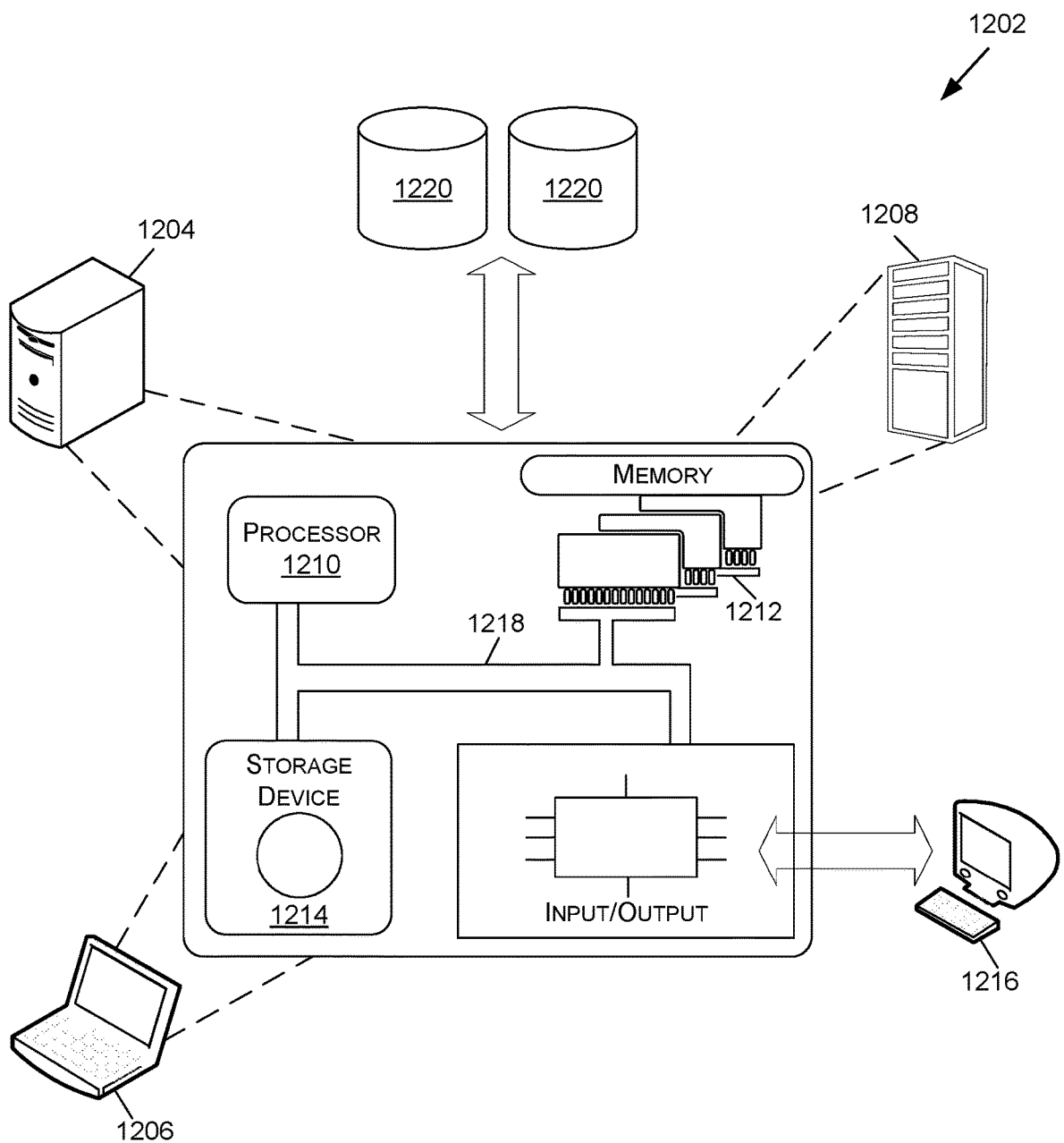
FIG. 12 is a functional block diagram illustrating a general-purpose computing system on which the present systems may be implemented according to various aspects of present disclosure.

FIG. 12 is a functional block diagram illustrating a general-purpose computing system on which the present implementations may be implemented according to various aspects of the present disclosure. The computer system 1202 may be embodied in at least one of a personal computer (also referred to as a desktop computer) 1204, a portable computer (also referred to as a laptop or notebook computer) 1206, and/or a server 1208 is a computer program and/or a machine that waits for requests from other machines or software (clients) and responds to them. A server typically processes data. The purpose of a server is to share data and/or hardware and/or software resources among clients. This architecture is called the client-server model. The clients may run on the same computer or may connect to the server over a network. Examples of computing servers include database servers, file servers, mail servers, print servers, web servers, game servers, and application servers. The term server may be construed broadly to include any computerized process that shares a resource to one or more client processes.

The computer system 1202 may execute at least some of the operations described above. The computer system 2102 may include at least one processor 1210, memory 1212, at least one storage device 1214, and input/output (I/O) devices 1216. Some or all of the components 1210, 1212, 1214, 1216 may be interconnected via a system bus 1218. The processor 1210 may be single- or multi-threaded and may have one or more cores. The processor 1210 execute instructions, such as those stored in the memory 1212 and/or in the storage device 1214. Information may be received and output using one or more I/O devices 1216.

The memory 1212 may store information, and may be a computer-readable medium, such as volatile or non-volatile memory. The storage device(s) 1214 may provide storage for the system 2102 and, in some implementations, may be a computer-readable medium. In various aspects, the storage device(s) 1214 may be a flash memory device, a hard disk device, an optical disk device, a tape device, or any other type of storage device.

The I/O devices 1216 may provide input/output operations for the system 1202. The I/O devices 1216 may include a keyboard, a pointing device, and/or a microphone. The I/O devices 1216 may further include a display unit for displaying graphical user interfaces, a speaker, and/or a printer. External data may be stored in one or more accessible external databases 1220.

The features of the present implementations described herein may be implemented in digital electronic circuitry, and/or in computer hardware, firmware, software, and/or in combinations thereof. Features of the present implementations may be implemented in a computer program product tangibly embodied in an information carrier, such as a machine-readable storage device, and/or in a propagated signal, for execution by a programmable processor. Implementations of the present method steps may be performed by a programmable processor executing a program of instructions to perform functions of the described implementations by operating on input data and generating output.

The features of the present implementations described herein may be implemented in one or more computer programs that are executable on a programmable system including at least one programmable processor coupled to receive data and/or instructions from, and to transmit data and/or instructions to, a data storage system, at least one input device, and at least one output device. A computer program may include a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions may include, for example, both general and special purpose processors, and/or the sole processor or one of multiple processors of any kind of computer. Generally, a processor may receive instructions and/or data from a read only memory (ROM), or a random-access memory (RAM), or both. Such a computer may include a processor for executing instructions and one or more memories for storing instructions and/or data.

Generally, a computer may also include, or be operatively coupled to communicate with, one or more mass storage devices for storing data files. Such devices include magnetic disks, such as internal hard disks and/or removable disks, magneto-optical disks, and/or optical disks. Storage devices suitable for tangibly embodying computer program instructions and/or data may include all forms of non-volatile memory, including for example semiconductor memory devices, such as EPROM, EEPROM, and flash memory devices, magnetic disks such as internal hard disks and removable disks, magneto-optical disks, and CD-ROM and DVD-ROM disks. The processor and the memory may be supplemented by, or incorporated in, one or more ASICs (application-specific integrated circuits).

To provide for interaction with a user, the features of the present implementations may be implemented on a computer having a display device, such as an LCD (liquid crystal display) monitor, for displaying information to the user. The computer may further include a keyboard, a pointing device, such as a mouse or a trackball, and/or a touchscreen by which the user may provide input to the computer.

The features of the present implementations may be implemented in a computer system that includes a back-end component, such as a data server, and/or that includes a middleware component, such as an application server or an Internet server, and/or that includes a front-end component, such as a client computer having a graphical user interface (GUI) and/or an Internet browser, or any combination of these. The components of the system may be connected by any form or medium of digital data communication, such as a communication network. Examples of communication networks may include, for example, a LAN (local area network), a WAN (wide area network), and/or the computers and networks forming the Internet.

The computer system may include clients and servers. A client and server may be remote from each other and interact through a network, such as those described herein. The relationship of client and server may arise by virtue of computer programs running on the respective computers and having a client-server relationship to each other.

As used herein, the phrases "at least one of A, B and C," "at least one of A, B, or C," and "A, B, and/or C" are synonymous and mean logical "OR" in the computer science sense. Thus, each of the foregoing phrases should be understood to read on (A), (B), (C), (A and B), (A and C), (B and C), and (A and B and C), where A, B, and C are variables representing elements or features of the claim. Also, while these examples are described with three variables (A, B, C) for ease of understanding, the same interpretation applies to similar phrases in these formats with any number of two or more variables.

The above description presents the best mode contemplated for carrying out the present implementations, and of the manner and process of practicing them, in such full, clear, concise, and exact terms as to enable any person skilled in the art to which they pertain to practice these implementations. The present implementations are, however, susceptible to modifications and alternate constructions from those discussed above that are fully equivalent. Consequently, the present invention is not limited to the particular implementations disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative implementations be performed concurrently. Likewise, steps that have been presented as being performed concurrently may in alternative implementations be performed separately.

In a first aspect, an audio/video (A/V) recording and communication doorbell device ("A/V doorbell) is coupled to a signaling device via doorbell power circuitry, the A/V doorbell comprises: a temperature sensor; a supercapacitor that discharges an amount of current according to an applied voltage to supply power to the A/V doorbell when an electrical switch when an electrical switch connected in series with the signaling device is opened; a power control system coupled to the supercapacitor and configured to: determine a first temperature based at least partly on first input from the temperature sensor; apply, based at least partly on the first temperature, a first voltage to charge the supercapacitor to a first amount of charge; detect that the electrical switch is opened at a first time; cause, based at least partly on the electrical switch being opened at the first time, the supercapacitor to discharge at least a portion of the first amount of charge by supplying a first amount of current to power the A/V doorbell; determine a second temperature based at least partly on second input from the temperature sensor, the second temperature being different from the first temperature; apply, based at least partly on the second temperature, a second voltage to charge the supercapacitor to a second amount of charge, the second amount of charge being different from the first amount of charge; detect that the electrical switch is opened at a second time; cause, based at least partly on the electrical switch being opened at the second time, the supercapacitor to discharge at least a portion of the second amount of charge by supplying a second amount of current to power the A/V doorbell.

In an implementation of the first aspect of the A/V doorbell, the power control system is further configured to determine a number of charge cycles and a number of discharge cycles of the supercapacitor; and the first voltage is based at least partly on the number of charge cycles and the number of discharge cycles of the supercapacitor.

In another implementation of the first aspect of the A/V doorbell, the power control system is further configured to determine a rate of decrease of charge of the supercapacitor between discharge events; and the first voltage is based at least partly on the rate of decrease of the charge of the supercapacitor between discharge events.

In another implementation of the first aspect of the A/V doorbell, the power control system is further configured to determine an amount of time for the signaling device to produce sound; and the first voltage is based at least partly on the amount of time for the signaling device to produce sound.

In another implementation of the first aspect of the A/V doorbell, determining the amount of time for the signaling device to produce sound is based at least partly on input via a user interface element included in a user interface displayed on a mobile device application.

In another implementation of the first aspect of the A/V doorbell, the A/V doorbell further comprising a relative humidity sensor; and the power control system is further configured to determine a relative humidity based at least partly on input received from the relative humidity sensor; and the first voltage is based at least partly on the relative humidity.

In another implementation of the first aspect of the A/V doorbell, the A/V doorbell further comprising supercapacitor control circuitry electrically coupled to the supercapacitor, and the supercapacitor is configured to discharge a first portion of the first amount of current during a first period of time to produce a first voltage at an input of the supercapacitor control circuitry, the first voltage being greater than a threshold voltage; the supercapacitor control circuitry is configured to reduce the first voltage to produce a second voltage at the output of the supercapacitor control circuitry that corresponds to the threshold voltage; the supercapacitor is further configured to discharge a second portion of the first amount of current during a second period of time subsequent to the first period of time to produce a third voltage at the input of the supercapacitor control circuitry, the third voltage being less than the threshold voltage; and the supercapacitor control circuitry is further configured to increase the third voltage to produce a fourth voltage at the output of the supercapacitor control circuitry that corresponds to the threshold voltage.

In another implementation of the first aspect of the A/V doorbell, the A/V doorbell draws power from the doorbell power circuitry during a period of time that the electrical switch is closed.

In another implementation of the first aspect of the A/V doorbell, the A/V doorbell further comprises a functional component including at least one of a camera, a lighting device, a display device, a processor, a wireless transceiver, or a memory device; and the power control system causes power to be supplied to the functional component of the A/V doorbell from the supercapacitor during the first time that the electrical switch is opened and the second time that the electrical switch is opened.

In another implementation of the first aspect of the A/V doorbell, the doorbell power circuitry includes a transformer that supplies power at voltages from 4 V AC to 30 V AC and adaptive circuitry, the adaptive circuitry configured to cause power to be diverted from the A/V doorbell to the signaling device based at least partly on a signal from the A/V doorbell to activate the signaling device.

In another implementation of the first aspect of the A/V doorbell, the adaptive circuitry includes a triode for alternating current (TRIAC), TRIAC control circuitry, and an AC/DC converter.

In another implementation of the first aspect of the A/V doorbell, the power control system is further configured to: monitor a voltage available to supply power to the A/V doorbell; and determine that the voltage is less than a threshold voltage; and when the voltage is less than the threshold voltage, the supercapacitor discharges the first amount of charge.

In a second aspect, an audio/video (A/V) recording and communication doorbell device comprises: one or more processors; memory communicatively coupled to the one or more processors and storing instructions that, when executed by the one or more processors, cause the one or more processors to: send a signal to cause a signaling device to output sound when a button of the A/V doorbell is pressed; supercapacitor control circuitry having an input electrically coupled to a supercapacitor of the A/V doorbell and an output electrically coupled to a camera of the A/V doorbell, the supercapacitor control circuitry configured to: supply power to the camera during a period of time based at least partly on sending the signal to the signaling device; detect that a first voltage at the input of the supercapacitor control circuitry is greater than a threshold voltage during a first portion of the period of time; produce a second voltage at the output of the supercapacitor control circuitry that is less than the first voltage, wherein the second voltage corresponds to the threshold voltage; detect that a third voltage at the input of the supercapacitor control circuitry is less than the threshold voltage during a second portion of the period of time subsequent to the first portion of the period of time; and produce a fourth voltage at the output of the supercapacitor control circuitry that is greater than the third voltage, wherein the fourth voltage corresponds to the threshold voltage.

In an implementation of the second aspect of the A/V doorbell, the supercapacitor is electrically coupled to the camera via a power supply rail and the supercapacitor control circuitry maintains a voltage of the power supply rail that is substantially similar to the threshold voltage.

In another implementation of the second aspect of the A/V doorbell, a battery is absent from the A/V doorbell.

In another implementation of the second aspect of the A/V doorbell, the A/V doorbell further comprises an environmental sensor including at least one of a temperature sensor, a relative humidity sensor, or a barometric pressure sensor; and the memory stores additional instructions that, when executed by the one or more processors, cause the one or more processors to perform additional operations comprising: determining an environmental condition based at least partly on input from the environmental sensor; determining, based at least partly on the environmental condition, a voltage to charge the supercapacitor to an amount of charge; and applying the voltage to the supercapacitor.

In another implementation of the second aspect of the A/V doorbell, the memory stores additional instructions that, when executed by the one or more processors, cause the one or more processors to perform additional operations comprising: obtaining input from an environmental sensor of the A/V doorbell, determining an indicator of performance degradation of the supercapacitor; determining an activation time of the signaling device; and determining a voltage to apply to charge the supercapacitor based at least partly on the input from the environmental sensor, the indicator of performance degradation, and the activation time of the signaling device.

In another implementation of the second aspect of the A/V doorbell, the memory stores further instructions that, when executed by the one or more processors, cause the one or more processors to perform further operations comprising: determining that the voltage to apply to charge the supercapacitor is greater than a threshold voltage; determining a modified activation time of the signaling device; and determining, based at least partly on the modified activation time, an additional voltage to apply to charge the supercapacitor.

In another implementation of the second aspect of the A/V doorbell, the memory stores additional instructions that, when executed by the one or more processors, cause the one or more processors to perform additional operations comprising: determining a first voltage to apply to charge the supercapacitor based at least partly on first input from a temperature sensor indicating a first ambient temperature around the A/V doorbell; determining that second input from the temperature sensor indicates a second ambient temperature that is above a threshold temperature; and determining a second voltage to apply to charge the supercapacitor based at least partly on the second input, the second voltage being less than the first voltage.

In another implementation of the second aspect of the A/V doorbell, the memory stores additional instructions that, when executed by the one or more processors, cause the one or more processors to perform additional operations comprising: determining a first voltage to apply to charge the supercapacitor based at least partly on a first indicator of performance degradation of the supercapacitor; determining that a second indicator of performance degradation of the supercapacitor corresponds to a greater amount of degradation of the supercapacitor than the first indicator of performance degradation; and determining a second voltage to apply to charge the supercapacitor based at least partly on the second indicator of performance degradation, the second voltage being greater than the first voltage.

In another implementation of the second aspect of the A/V doorbell, the memory stores additional instructions that, when executed by the one or more processors, cause the one or more processors to perform additional operations comprising: determining a first voltage to apply to charge the supercapacitor based at least partly on a first activation time of the signaling device; determining that the first activation time has been modified to a second activation time that is longer than the first activation time; and determining a second voltage to apply to charge the supercapacitor based at least partly on the second activation time, the second voltage being greater than the first voltage.

In another implementation of the second aspect of the A/V doorbell, the A/V doorbell further comprises: a mounting apparatus to attach to a structure; and a wireless transceiver to transmit and receive information via a network hub using a wireless communications protocol; and doorbell power circuitry coupled to the A/V doorbell and the signaling device is located within the structure.

In a third aspect, a method for controlling power provided by a supercapacitor to an audio/video (A/V) recording and communication doorbell device that is coupled to doorbell power circuitry and a signaling device, the method comprising: receiving input to open an electrical switch to cause the signaling device to activate, the electrical switch being coupled to the doorbell power circuitry; determining, by a power control system of the A/V doorbell, a first temperature based at least partly on first input from the temperature sensor; applying, by the power control system and based at least partly on the first temperature, a first voltage to charge a supercapacitor of the A/V doorbell to a first amount of charge; detecting, by the power control system, a first time that the electrical switch is opened; causing, by the power control system and based at least partly on the electrical switch being opened at the first time, the supercapacitor to discharge at least a portion of the first amount of charge and supply a first amount of current to power the A/V doorbell; determining, by the power control system, a second temperature based at least partly on second input from the temperature sensor, the second temperature being different from the first temperature; applying, by the power control system and based at least partly on the second temperature, a second voltage to charge the supercapacitor to a second amount of charge, the second amount of charge being different from the first amount of charge; detecting, by the power control system, that the electrical switch is opened at a second time; causing, by the power control system and based at least partly on the electrical switch being opened at the second time, the supercapacitor to discharge at least a portion of the second amount of charge and supply a second amount of current to power the A/V doorbell.

In an implementation of the third aspect, the method further comprising determining, by the power control system, a number of charge cycles and a number of discharge cycles of the supercapacitor; and the first voltage is based at least partly on the number of charge cycles and the number of discharge cycles of the supercapacitor.

In another implementation of the third aspect, the method further comprising determining, by the power control system, a rate of decrease of charge of the supercapacitor between discharge events; and the first voltage is based at least partly on the rate of decrease of the charge of the supercapacitor between discharge events.

In another implementation of the third aspect, the method, further comprising determining, by the power control system, an amount of time for the signaling device to produce sound; and the first voltage is based at least partly on the amount of time for the signaling device to produce sound.

In another implementation of the third aspect, the method further comprising obtaining input from a mobile device application executing on a computing device, the computing device displays a user interface including a user interface element, the input is entered via the user interface element, and the input indicates an amount of time for the signaling device to produce sound.

In another implementation of the third aspect, the method further comprising determining a relative humidity based at least partly on input received from the relative humidity sensor; and the first voltage is based at least partly on the relative humidity.

In another implementation of the third aspect, the method further comprising: discharging, by the supercapacitor, a first portion of the first amount of current during a first period of time to produce a first voltage at an input of the supercapacitor control circuitry, the first voltage being greater than a threshold voltage; reducing, by the supercapacitor control circuitry, the first voltage to produce a second voltage at the output of the supercapacitor control circuitry that corresponds to the threshold voltage; discharging, by the supercapacitor, a second portion of the first amount of current during a second period of time subsequent to the first period of time to produce a third voltage at the input of the supercapacitor controller, the third voltage being less than the threshold voltage; and increasing, by the supercapacitor control circuitry, the third voltage to produce a fourth voltage at the output of the supercapacitor control circuitry that corresponds to the threshold voltage.

In another implementation of the third aspect, the method further comprising drawing power, by the A/V doorbell, during a period of time that the electrical switch is open.

In another implementation of the third aspect, the A/V doorbell further comprises a functional component including a camera, a lighting device, a display device, a processor, a wireless transceiver, or a memory device; and the method further comprises causing, by the power control system, power to be supplied to the functional component from the supercapacitor during the first closure of the electrical switch and the second closure of the electrical switch.

In another implementation of the third aspect, the doorbell power circuitry includes a transformer that supplies power at voltages from 4 V AC to 30 V AC, and the method further comprises causing, by adaptive circuitry, power to be diverted from the A/V doorbell to the signaling device based at least partly on a signal from the A/V doorbell to activate the signaling device.

In another implementation of the third aspect, the adaptive circuitry includes a triode for alternating current (TRIAC), TRIAC control circuitry, and an AC/DC converter.

In another implementation of the third aspect, the power control system is coupled to the supercapacitor and the method further comprises: monitoring, by the power control system, a voltage available to supply power to the A/V doorbell; and determining, by the power control system, that the voltage is less than a threshold voltage; and discharging, by the supercapacitor, the first amount of charge based at least partly on the voltage being less than the threshold voltage.

In a fourth aspect, a method comprising: receiving a press of a button of an A/V doorbell; sending, after the press of the button, a signal to a signaling device; supplying, by supercapacitor control circuitry, power to a camera of the A/V doorbell during a period of time; detecting that a first voltage at an input of the supercapacitor control circuitry is greater than a threshold voltage during a first portion of the period of time; producing a second voltage at the output of the supercapacitor control circuitry that is less than the first voltage, the second voltage corresponds to the threshold voltage; detecting that a third voltage at the input of the supercapacitor control circuitry is less than the threshold voltage during a second portion of the period of time subsequent to the first portion of the period of time; and producing a fourth voltage at the output of the supercapacitor control circuitry that is greater than the third voltage, the fourth voltage corresponds to the threshold voltage.

In an implementation of the fourth aspect, the method further comprising maintaining a voltage of a power supply rail that is substantially similar to the threshold voltage, the supercapacitor is electrically coupled to the camera via the power supply rail.

In another implementation of the fourth aspect, a battery is absent from the A/V doorbell.

In another implementation of the fourth aspect, the method further comprising: determining an environmental condition based at least partly on input from an environmental sensor; determining, based at least partly on the environmental condition, a voltage to charge the supercapacitor to an amount of charge; and applying the voltage to the supercapacitor.

In another implementation of the fourth aspect, the method further comprising: obtaining input from an environmental sensor of the A/V doorbell, determining an indicator of performance degradation of the supercapacitor; determining an activation time of the signaling device; and determining a voltage to apply to charge the supercapacitor based at least partly on the input from the environmental sensor, the indicator of performance degradation, and the activation time of the signaling device.

In another implementation of the fourth aspect, the method further comprising: determining that the voltage to apply to charge the supercapacitor is greater than a threshold voltage; determining a modified activation time of the signaling device; and determining, based at least partly on the modified activation time, an additional voltage to apply to charge the supercapacitor.

In another implementation of the fourth aspect, the method further comprising: determining a fifth voltage to apply to charge the supercapacitor based at least partly on first input from a temperature sensor indicating a first ambient temperature around the A/V doorbell; determining that second input from the temperature sensor indicates a second ambient temperature that is above a threshold temperature; and determining a sixth voltage to apply to charge the supercapacitor based at least partly on the second input, the sixth voltage being less than the fifth voltage.

In another implementation of the fourth aspect, the method further comprising: determining a fifth voltage to apply to charge the supercapacitor based at least partly on a first indicator of performance degradation of the supercapacitor; determining that a second indicator of performance degradation of the supercapacitor corresponds to a greater amount of degradation of the supercapacitor than the first indicator of performance degradation; and determining a sixth voltage to apply to charge the supercapacitor based at least partly on the second indicator of performance degradation, the sixth voltage being greater than the fifth voltage.

In another implementation of the fourth aspect, the method further comprising: determining a fifth voltage to apply to charge the supercapacitor based at least partly on a first activation time of the signaling device; determining that the first activation time has been modified to a second activation time that is longer than the first activation time; and determining a sixth voltage to apply to charge the supercapacitor based at least partly on the second activation time, the sixth voltage being greater than the fifth voltage.

In another implementation of the fourth aspect, the A/V doorbell includes a mounting apparatus to attach to a structure and a wireless transceiver to transmit and receive information via a network hub using a wireless communications protocol.

What is claimed is:

1. An audio/video (A/V) recording and communication doorbell device ("A/V doorbell") comprising:
   a button;
   a camera;
   a supercapacitor;
   one or more processors;
   power circuitry that causes, during a first period of time, an external power source to be connected to the camera;
   memory communicatively coupled to the one or more processors and storing instructions that, when executed by the one or more processors, cause the one or more processors to:
      receive first data from the button; and
      based at least in part on the first data, cause, during a second period of time, the external power source to be connected to a signaling device; and
   control circuitry having an input electrically coupled to the supercapacitor and an output, the control circuitry configured to:
      cause, based at least partly on the external power source being connected to the signaling device, the output to be connected to the camera during the second period of time;
      detect that a first voltage at the input of the control circuitry is greater than a threshold voltage during a first portion of the second period of time;
      produce a second voltage at the output of the control circuitry that is less than the first voltage;
      detect that a third voltage at the input of the control circuitry is less than the threshold voltage during a second portion of the second period of time subsequent to the first portion of the second period of time; and
      produce a fourth voltage at the output of the control circuitry that is greater than the third voltage.

2. The A/V doorbell of claim 1, wherein the supercapacitor is electrically coupled to the camera via a power supply rail, and the control circuitry maintains a fifth voltage of the power supply rail that is within a tolerance of the threshold voltage.

3. The A/V doorbell of claim 1, further comprising an environmental sensor that includes at least one of a temperature sensor, a humidity sensor, or a barometric pressure sensor, and wherein the memory stores further instructions that, when executed by the one or more processors, cause the one or more processors to perform further operations comprising:
   receiving sensor data from the environment sensor;
   determining an environmental condition based at least partly on the sensor data;
   determining, based at least partly on the environmental condition, a fifth voltage to charge the supercapacitor to an amount of charge; and
   applying the fifth voltage to charge the supercapacitor.

4. The A/V doorbell of claim 1, wherein the memory stores further instructions that, when executed by the one or more processors, cause the one or more processors to perform further operations comprising:
   receiving sensor data from an environmental sensor;
   determining, based at least partly on the sensor data, an indicator of performance degradation of the supercapacitor;
   determining a first activation time of the signaling device; and
   determining a fifth voltage to apply to charge the supercapacitor based at least partly on the sensor data, the indicator of performance degradation, and the first activation time.

5. The A/V doorbell of claim 4, wherein the memory stores further instructions that, when executed by the one or more processors, cause the one or more processors to perform further operations comprising:
   determining that the fifth voltage is greater than the threshold voltage;
   determining a second activation time of the signaling device; and
   determining, based at least partly on the second activation time, a sixth voltage to apply to charge the supercapacitor.

6. A method comprising:
   causing an external power source to be connected to a camera of an audio/video recording and communication doorbell device ("A/V doorbell");
   receiving first data from a button of the A/V doorbell;
   based at least partly on the receiving of the first data, causing the external power source to be connected to a signaling device coupled to the A/V doorbell;
   based at least partly on the external power source being connected to the signaling device, causing, by control circuitry, a supercapacitor to be connected to the camera during a period of time;

detecting that a first voltage at an input of the control circuitry is greater than a threshold voltage during a first portion of the period of time; and
producing a second voltage at an output of the control circuitry that is less than the first voltage.

7. The method of claim 6, further comprising:
receiving second data from a temperature sensor;
determining that the second data indicates a first ambient temperature;
determining a third voltage to apply to charge the supercapacitor based at least partly on the first ambient temperature;
receiving third data from the temperature sensor;
determining that the third data indicates a second ambient temperature that is above a threshold temperature; and
determining a fourth voltage to apply to charge the supercapacitor based at least partly on the second ambient temperature being above the threshold temperature, the fourth voltage being less than the third voltage.

8. The method of claim 6, further comprising:
determining a first indicator of performance degradation of the supercapacitor;
determining a third voltage to apply to charge the supercapacitor based at least partly on the first indicator of performance degradation;
determining a second indicator of performance degradation of the supercapacitor;
determining that the second indicator of performance degradation includes a greater amount of degradation than the first indicator of performance degradation; and
determining a fourth voltage to apply to charge the supercapacitor based at least partly on the second indicator of performance degradation, the fourth voltage being greater than the third voltage.

9. The method of claim 6, further comprising:
determining a third voltage to apply to charge the supercapacitor based at least partly on a first activation time of the signaling device;
determining a second activation time of the signaling device, the second activation time being longer than the first activation time; and
determining a fourth voltage to apply to charge the supercapacitor based at least partly on the second activation time, the fourth voltage being greater than the third voltage.

10. The method of claim 6, further comprising:
applying a third voltage to charge the supercapacitor to an amount of charge;
detecting that an electrical switch coupled between the A/V doorbell and the signaling device is opened; and
causing, based at least partly on the electrical switch being opened, the supercapacitor to discharge at least a portion of the amount of charge by supplying an amount of current to power the A/V doorbell.

11. The A/V doorbell of claim 1, wherein the signaling device comprises at least one of:
a device that includes a speaker; or
a chime.

12. An electronic device comprising:
a camera;
a capacitor;
one or more processors;
power circuitry that causes an external power source to be connected to the camera;
memory storing instructions that, when executed by the one or more processors, cause the electronic device to perform operations comprising:
detecting an object;
based at least partly on the detecting of the object, causing the external power source to be connected to a signaling device;
based at least partly on the causing of the external power source to be connected to the signaling device, causing the capacitor to be connected to the camera;
detecting that a first voltage output by the capacitor is greater than a threshold voltage; and
producing a second voltage for the third power supplied to the camera.

13. The electronic device of claim 12, wherein the second voltage corresponds to the threshold voltage.

14. The electronic device of claim 12, further comprising a sensor, and wherein the memory stores further instructions that, when executed by the one or more processors, cause the one or more processors to perform further operations comprising:
receiving data from the sensor;
determining an environmental condition based at least partly on the data;
determining, based at least partly on the environmental condition, a third voltage to charge the capacitor to an amount of charge; and
causing the third voltage to be applied to the capacitor.

15. The electronic device of claim 12, further comprising a sensor, and wherein the memory stores further instructions that, when executed by the one or more processors, cause the one or more processors to perform further operations comprising:
receiving data from the sensor;
determining an indicator of performance degradation of the capacitor;
determining a first activation time of the signaling device; and
determining a third voltage to apply to charge the capacitor based at least partly on the data, the indicator of performance degradation, and the first activation time.

16. The electronic device of claim 15, wherein the memory stores further instructions that, when executed by the one or more processors, cause the one or more processors to perform further operations comprising:
determining that the third voltage to apply to charge the supercapacitor is greater than the threshold voltage;
determining a second activation time of the signaling device; and
determining, based at least partly on the second activation time, a fourth voltage to apply to charge the supercapacitor.

17. The electronic device of claim 12, further comprising a motion sensor, and wherein the detecting of the object comprises at least:
receiving data from the motion sensor; and
determining, based at least partly on the data, that the motion sensor detected an object.

18. The electronic device of claim 12, further comprising a button, and wherein the detecting of the object comprises at least:
receiving data from the button; and
determining, based at least partly on the data, that the button received an input.

19. The method of claim 6, wherein:
causing the external power source to be connected to the camera comprises causing a switch to closer such that the external power source is connected to the camera; and
causing the external power source to be connected to the signaling device comprises causing the switch to open such that the external power source is connected to the signaling device.

20. The electronic device as recited in claim 12, wherein the memory stores further instructions that, when executed by the one or more processors, cause the one or more processors to perform further operations comprising:
causing the external power source to again be connected to the camera;
based at least partly on the causing of the external power source to again be connected to the camera, causing the capacitor to no longer be connected to the camera.

\* \* \* \* \*